United States Patent
Nito et al.

(10) Patent No.: US 10,025,223 B2
(45) Date of Patent: Jul. 17, 2018

(54) INK JET RECORDING MEDIUM HAVING ANIONIC INORGANIC PARTICLES

(71) Applicant: CANON KABUSHIKI KAISHA, Tokyo (JP)

(72) Inventors: Yasuhiro Nito, Inagi (JP); Takatoshi Tanaka, Tokyo (JP); Arika Tanaka, Yokohama (JP); Tetsufumi Shiba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/703,859

(22) Filed: Sep. 13, 2017

(65) Prior Publication Data

US 2018/0074434 A1    Mar. 15, 2018

(30) Foreign Application Priority Data

Sep. 15, 2016   (JP) ................. 2016-180712

(51) Int. Cl.
| | |
|---|---|
| G03G 15/08 | (2006.01) |
| G03G 15/01 | (2006.01) |
| B41M 5/50 | (2006.01) |
| B41M 5/52 | (2006.01) |
| C01F 7/56 | (2006.01) |
| C08G 83/00 | (2006.01) |

(52) U.S. Cl.
CPC ......... *G03G 15/0812* (2013.01); *B41M 5/502* (2013.01); *B41M 5/506* (2013.01); *B41M 5/508* (2013.01); *B41M 5/5218* (2013.01); *B41M 5/5245* (2013.01); *G03G 15/0121* (2013.01); *G03G 15/0808* (2013.01); *C01F 7/56* (2013.01); *C08G 83/00* (2013.01); *G03G 2215/0634* (2013.01)

(58) Field of Classification Search
CPC ...... B41M 5/502; B41M 5/506; B41M 5/508; B41M 5/5218; B41M 5/5245
See application file for complete search history.

(56) References Cited

U.S. PATENT DOCUMENTS

| | | | | |
|---|---|---|---|---|
| 4,554,181 A | * | 11/1985 | Cousin | ..................... B41M 5/52 346/96 |
| 2004/0033377 A1 | * | 2/2004 | Koenig | ................ B41M 5/0011 428/458 |
| 2014/0004263 A1 | * | 1/2014 | Noguchi | ................ B41M 5/502 427/256 |

FOREIGN PATENT DOCUMENTS

| | | |
|---|---|---|
| JP | 61-10483 A | 1/1986 |
| JP | 2011-42046 A | 3/2011 |

* cited by examiner

*Primary Examiner* — Betelhem Shewareged
(74) *Attorney, Agent, or Firm* — Canon U.S.A., Inc. IP Division

(57) ABSTRACT

An ink let recording medium of this disclosure has a substrate and at least one or more ink receiving layers on the substrate, in which a first ink receiving layer which is the outermost surface layer contains anionic inorganic particles having an average particle diameter of 3.0 μm or more, a binder, a cationic polymer, and a polyvalent metal salt, the content of the polyvalent metal salt based on the anionic inorganic particles in the first ink receiving layer is 5 mass % or more and 40 mass % or less, the content ratio of the polyvalent metal salt to the cationic polymer in the first ink receiving layer (Content of polyvalent metal salt/Content of cationic polymer) is 1.0 or more and 8.0 or less, and the arithmetic average roughness Ra of the surface of the recording medium is 1.0 μm or more.

11 Claims, No Drawings

INK JET RECORDING MEDIUM HAVING ANIONIC INORGANIC PARTICLES

BACKGROUND OF THE DISCLOSURE

Field of the Disclosure

The present disclosure relates to an ink jet recording medium.

Description of the Related Art

An ink jet recording medium (hereinafter also simply referred to as "recording medium") has been demanded to have various kinds of performance of absorbency, color development properties, and bleeding resistance of an ink in order to obtain a high-resolution image. For example, in order to obtain high color development properties, the application amount of an ink to the recording medium may be increased. On the other hand, the increase in the application amount is likely to cause bleeding. In order to prevent the occurrence of the bleeding, Japanese Patent Laid-Open No. 2011-42046 discloses blending a polyvalent metal salt in an ink receiving layer of the recording medium. By blending the polyvalent metal salt in the ink receiving layer, metal ions in the polyvalent metal salt are bonded to a coloring material in an ink, which prevents the movement in the horizontal direction of the ink given onto the recording medium.

SUMMARY

The present disclosure is directed to providing an ink jet recording medium excellent in color development properties and bleeding resistance of an image to be formed with a pigment ink and also excellent in strength of an ink receiving layer.

According to one aspect of the present disclosure, an ink jet recording medium has a substrate and at least one or more ink receiving layers on the substrate, in which a first ink receiving layer which is the outermost surface layer contains anionic inorganic particles having an average particle diameter of 3.0 μm or more, a binder, a cationic polymer, and a polyvalent metal salt, the content of the polyvalent metal salt based on the anionic inorganic particles in the first ink receiving layer is 5 mass % or more and 40 mass % or less, the content ratio of the polyvalent metal salt to the cationic polymer in the first ink receiving layer (Content of polyvalent metal salt/Content of cationic polymer) is 1.0 or more and 8.0 or less, and the arithmetic average roughness Ra of the surface of the recording medium is 1.0 μm or more.

Further features of the present disclosure will become apparent from the following description of exemplary embodiments.

DESCRIPTION OF THE EMBODIMENTS

In recent years, a demand for a fine art paper for professional photographers and graphic designers using a recording medium has increased. The professional photographers and the graphic designers have demanded to produce printed matter with high fastness. Therefore, even in the case where not only a dye ink but a pigment ink which provides an image with high fastness is used, a recording medium capable of achieving both color development properties and bleeding resistance at a high level has been demanded. However, an examination of the present inventors has proved that the recording medium described in Japanese Patent Laid-Open No. 2011-42046 has been insufficient to achieve both color development properties and bleeding resistance at a high level with a pigment ink which has been demanded in the use for processionals.

Furthermore, it has also been found that the recording medium described in Japanese Patent Laid-Open No. 2011-42046 has had another problem that the strength of the ink receiving layer is insufficient to achieve a level demanded in the use for professionals. The present inventors have conducted an extensive examination in order to provide an ink jet recording medium excellent in color development properties and bleeding resistance of an image to be formed with a pigment ink and also excellent in strength of an ink receiving layer and, as a result, have completed the present disclosure.

Hereinafter, the present disclosure is described in detail with reference to suitable embodiments.

The present inventors have focused on a cationic component contained in the ink receiving layer in order to obtain high color development properties and high bleeding resistance with a pigment ink demanded by professional photographers and graphic designers. Specifically, the present inventors have focused on a cationic polymer which is a cationic component and a polyvalent metal salt contained in the ink receiving layer, and then the present inventors have conducted a further examination.

Furthermore, in the case of a recording medium, such as a fine art paper, an ink receiving layer is formed on a substrate having uneven surface properties, such as a cotton paper, and therefore the surface having a characteristic texture resulting from the unevenness of the substrate is formed on the surface of the recording medium. On the other hand, the presence of the unevenness of the surface of the recording medium has sometimes posed another problem that, after a pigment ink is given to a recording medium, the pigment in the ink given to the recording medium or the ink receiving layer itself is easily separated.

Therefore, the present inventors have examined various configurations in order to achieve a state where the color development properties and the bleeding resistance are high and the strength of the ink receiving layer after the pigment ink is given is also high with a pigment ink, and, as a result, have reached the configuration of the present disclosures.

In the recording medium of the present disclosure, the first ink receiving layer which is the outermost surface layer contains anionic inorganic particles having an average particle diameter of 3.0 μm or more, a binder, a cationic polymer, and a polyvalent metal salt. The content of the polyvalent metal salt based on the anionic inorganic particles and the content ratio of the polyvalent metal salt to the cationic polymer in the first ink receiving layer are controlled in specific ranges.

The present inventors have found that, due to such a configuration, the material type and the material ratio in the ink receiving layer are synergistically affected, and, as a result, the above-described problems can be solved.

Recording Medium

Hereinafter, the components configuring a recording medium of the present disclosure are individually described.

Substrate

Examples of substrates include an air permeable substrate containing only a substrate, such as a paper substrate, and those having a substrate and a resin layer, i.e., those in which a substrate is covered with resin. In the present disclosure, it is suitable from the viewpoint of the permeability of an ink when a pigment ink is printed to use the air permeable substrate containing only a substrate, i.e., the substrate is only a paper substrate or a cotton substrate. When the substrate is air permeable, a solvent component of the pigment ink easily permeates, so that high color development properties are obtained when combined with the ink receiving layer of the present disclosure.

The substrate is formed using wood pulp as the main raw material and, as required, adding synthetic pulp, such as polypropylene, and synthetic fibers, such as nylon and polyester. Examples of the wood pulp include leaf bleached kraft pulp (LBKP), leaf bleached sulphite pulp (LBSP), northern bleached kraft pulp (NBKP), northern bleached sulphite pulp (NBSP), leaf dissolving pulp (LDP), northern dissolving pulp (NDP), leaf unbleached kraft pulp (LUKP), northern unbleached kraft pulp (NUKP), and the like. One or two or more kinds thereof can be used as required. Among the wood pulp, LBKP, NBSP, LBSP, NDP, and LDP containing short fiber components in a high proportion are suitably used. As the pulp, chemical pulp with few impurities (sulfate pulp and sulfite pulp) is suitable. Moreover, pulp whose degree of whiteness is improved by performing bleaching treatment is also suitable. Into the paper substrate, a sizing agent, a white pigment, a paper reinforcing agent, a fluorescent brightening agent, a moisture maintenance agent, a dispersing agent, a softening agent, and the like may be added as appropriate.

As a high-class fine art paper for professional photographers or graphic designers, it is desirable to use cotton materials in order to express natural texture or unevenness. "Cotton paper" refers to a sheet-like substance containing cotton in a proportion of 10 mass % or more, suitably 50 mass % or more, and more suitably 100 mass % as fiber raw materials. In the cotton paper, fiber raw materials contained in usual paper, such as the wood pulp mentioned above, may be blended as fiber raw materials other than cotton. Herein, the "cotton" refers to fibers growing in plants of Gossypium and seeds thereof. Specifically, sea island cotton, Egyptian cotton, upland cotton, Asia cotton, and the like are mentioned, and one or two or more kinds thereof is/are used. Moreover, the cotton may be filaments or linters and is selected as appropriate according to the texture or the like required in the recording medium. In usual, the cotton is used as the fiber raw materials after subjected to digestion treatment or bleaching treatment as with the wood pulp, but the content of components other than cellulose, such as lignin, contained in the cotton is low. Therefore, the conditions of the digestion treatment or the bleaching treatment of the cotton may be milder than the conditions of the treatment performed to usual wood pulp. Specifically, the cotton is used after subjected to digestion treatment in about 5% alkali, and then subjected to bleaching treatment of about one stage using hypochlorous acid or the like, for example.

In the present disclosure, the thickness of the substrate is suitably 100 µm or more and 800 µm or less and more suitably 200 µm or more and 600 µm or less.

In the present disclosure, the thickness of the substrate can be calculated by the following method. First, the cross section of the recording medium is cut out by a microtome, and then the cross section is observed under a scanning electron microscope. Then, the thickness of arbitrary 5 or more points of the substrate is measured, and the average value is defined as the thickness of the substrate. The thickness of the other layers in the present disclosure is also calculated by the similar method.

In the present disclosure, the basis weight of the substrate is suitably 150 g/m² or more and 600 g/m² or less and more suitably 200 g/m² or more and 350 g/m² or less.

In the present disclosure, those having a large number of gaps thereinside, i.e., those having a low density, are suitable and the paper density specified by JIS P 8118 of the substrate is suitably 1.0 g/cm³ or less from the viewpoint of expressing natural texture or a feeling of unevenness. Furthermore, the paper density is more suitably 0.5 g/cm³ or more and 0.9 g/cm³ or less. The paper density is particularly suitably 0.6 g/cm³ or more and 0.8 g/cm³ or less.

In the present disclosure, the permeability of the substrate is suitably 5 g/m² or more and 30 g/m² or less by the Cobb method (Cobb60) described in ISO535. When the permeability of the substrate is 5 g/m² or more, the permeability of the pigment ink is particularly good. When the permeability of the substrate is 30 g/m² or less, the pigment ink is easily fixed to the surface side of the ink receiving layer, so that high color development properties are obtained.

The permeability of the substrate is more suitably 5 g/m² or more and 20 g/m² or less.

The arithmetic average roughness Ra specified by JIS B 0601:2001 of the substrate surface according to the present disclosure is suitably 1.0 µm or more and more suitably 1.5 µm or more from the point of the uneven texture of the surface of the recording medium. When the Ra is higher, i.e., when the surface roughness of the substrate is higher, the strength of the ink receiving layer formed on the substrate tends to decrease. Therefore, in a recording medium in which the Ra of the substrate surface is high, the effects of the present disclosure can be further demonstrated.

Ink Receiving Layer

In the present disclosure, the ink receiving layer has at least one or more ink receiving layers on the substrate. For example, the ink receiving layer may have a first ink receiving layer which is the outermost surface layer of the recording medium and a second ink receiving layer adjacent to the lower side of the first ink receiving layer. The thickness of the entire ink receiving layer is suitably 40 µm or less, more suitably 36 µm or less, and still more suitably 30 µm or less from the point of the strength of the ink receiving layer after the pigment ink is given. The thickness of the entire ink receiving layer is suitably 12 µm or more, more suitably 15 µm or more, and still more suitably 18 µm or more from the viewpoint of the color development properties and the bleeding resistance of the pigment ink.

The coating amount of the entire ink receiving layer is suitably 15 g/m² or less from the point of the strength of the ink receiving layer after the pigment ink is given. The coating amount is suitably 6 g/m² or more from the viewpoint of the color development properties and the bleeding resistance of the pigment ink.

The thickness and the coating amount of each ink receiving layer when the ink receiving layer has the first ink receiving layer which is the outermost surface layer of the recording medium and the second ink receiving layer adjacent to the lower side of the first ink receiving layer.

The thickness of the first ink receiving layer according to the present disclosure is suitably 6 µm or more and more suitably 9 µm or more from the point of the strength of the ink receiving layer after the pigment ink is given. The thickness of the first ink receiving layer is suitably 30 µm or less, more suitably 24 µm or less, and more suitably 18 µm or less from the point of the color development properties. The coating amount of the first ink receiving layer is suitably 2 g/m² or more and 10 g/m² or less and more suitably 3 g/m² or more and 8 g/m² or less from the point of the strength of the ink receiving layer after printing is performed with the pigment ink.

The thickness of the second ink receiving layer according to the present disclosure is suitably 6 µm or more and more suitably 9 µm or more from the point of the permeability of the pigment ink. The thickness of the second ink receiving layer is suitably 30 µm or less, more suitably 24 µm or less, and more suitably 18 µm or less from the point of the strength of the ink receiving layer after the pigment ink is given. The coating amount of the second ink receiving layer is suitably 2 g/m² or more and 10 g/m² or less and more suitably 3 g/m² or more and 8 g/m² or less from the point of the strength of the ink receiving layer after printing is performed with the pigment ink.

A ratio ($L_1/L_2$) of the thickness ($L_1$) of the first ink receiving layer to the thickness ($L_2$) of the second ink receiving layer is suitably 0.3 or more in the respect of the strength of the ink receiving layer. The $L_1/L_2$ is more suitably 0.4 or more. The $L_1/L_2$ is suitably 4.0 or less in the respect of color development properties. The $L_1/L_2$ is more suitably 2.3 or less. The $L_1/L_2$ is most suitably in the range of 0.7 or more and 2.3 or less.

The arithmetic average roughness Ra specified by JIS B 0601:2001 of the surface of the recording medium according to the present disclosure is suitably 1.0 µm or more and more suitably 3.0 µm or more from the point of the unevenness texture of the surface of the recording medium. When the Ra is higher, i.e., the surface roughness of the recording medium is higher, the strength of the ink receiving layer after the pigment ink is printed needs to be increased, and therefore the effects of the present disclosure are further demonstrated.

Anionic Inorganic Particles

In the present disclosure, the first ink receiving layer and the second ink receiving layer each contain anionic inorganic particles having an average particle diameter of 3.0 µm or more.

As the anionic inorganic particles, wet silica is suitably used. The wet silica contains particles containing $SiO_2$: 93% or more, $Ak_2O_3$: about 5% or less, and $Na_2O$: about 5% or less in terms of dry mass. A so-called white carbon, silica gel, porous wet silica, and the like are mentioned. Methods for producing silica are roughly classified into a dry method and a wet method. As the dry method, combustion method and a heating method are mentioned. As the wet method, production methods referred to as a precipitating method and a gel method are mentioned. The dry combustion method is generally a method including burning a mixture of evaporated silicon tetrachloride and hydrogen in the 1,600 to 2,000° C. air and also referred to as a gaseous phase method. The wet precipitating method is a method usually including causing sodium silicate and sulfuric acid or the like to react with each other in an aqueous solution to precipitate $SiO_2$, in which the specific surface area, the primary particle diameter, and the like of silica can be adjusted depending on the conditions, such as the reaction temperature and the acid addition speed. The secondary particle diameter and the silica physical properties are slightly changed depending on the dry or pulverization conditions. According to the wet gel method, silica is generally produced by causing sodium silicate and sulfuric acid to react with each other by simultaneous addition or the like. In the case of silica particles, a three-dimensional hydrogel structure due to the progress of dehydration condensation of a silanol group is mentioned, for example. The feature is as follows: Due to the hydrogel structure in which the primary particles are relatively small, secondary particles with a large specific surface area are produced, and the size of the primary particle diameter is changed by changing the reaction conditions or the like, so that secondary particle different in oil absorption can be produced. Examples of the wet silica suitably used for the present disclosure include AY-603 (10 µm) and BY-001 (16 µm) manufactured by Tosoh Silica Corporation, SYLOID C807 (7 µm), ED5 (8 µm), C809 (9 µm), CP510-10025 (11 µm), CP4-9117 (11 µm), and C812 (12 µm) manufactured by GRACE, GasilHP39 (10 µm) and GasilHP395 (14 µMm) manufactured by PQ corporation, P78D (12 µm) manufactured by MIZUSAWA INDUSTRIAL CHEMICALS, LTD., and the like.

The average particle diameter in the present disclosure refers to a volume average particle diameter calculated when measured with a laser diffraction particle diameter distribution meter (manufactured by Shimadzu Corporation, SALD-2300). For example, when the wet silica is used as the anionic inorganic particles, the wet silica is present as secondary particles formed by the aggregation of primary particles, and therefore the "average particle diameter" means a "volume average secondary particle diameter".

The average particle diameter of the anionic inorganic particles is suitably 7.0 µm or more and more suitably 8.0 µm or more from the point of color development properties. The average particle diameter of the anionic inorganic particles is suitably 14.0 µm or less and more suitably 12.0 µm or less from the point of the strength of the ink receiving layer.

The pore volume of the anionic inorganic particles is suitably 1.3 ml/g or more and more suitably 1.6 ml/g or more from the viewpoint ink absorbency. The specific surface area of the anionic inorganic particles is suitably 200 m²/g or more and 400 m²/g or less.

In addition to the anionic inorganic particles having an average particle diameter of 3.0 µm or more, anionic inorganic particles, such as alumina hydrate and fumed silica, may be further contained, for example.

Binder

In the present disclosure, the binder means a material capable of binding the anionic inorganic particles to form the ink receiving layer. In the present disclosure, the first ink receiving layer and the second ink receiving layer each contain the binder.

In the present disclosure, the content of the binder based on the anionic inorganic particles in the second ink receiving layer is lower than the content of the binder based on the anionic inorganic particles in the first ink receiving layer in the respect of color development properties and strength.

The content of the binder based on the content of the anionic inorganic particles in the first ink receiving layer is suitably 50 mass % or more and more suitably 70 mass % or more from the point of the strength of the ink receiving layer. The content of the binder based on the content of the anionic inorganic particles in the first ink receiving layer is suitably 100 mass % or less and more suitably 90 mass % or less from the viewpoint of bleeding resistance.

The content of the binder based on the content of anionic inorganic particles in the second ink receiving layer is suitably 40 mass % or less and more suitably 30 mass % or less from the viewpoint of an improvement of color development properties by improving the permeability of the pigment ink. The content of the binder based on the content of the anionic inorganic particles in the second ink receiving layer is suitably 15 mass % or more and more suitably 25 mass % or more from the viewpoint of adhesion with the substrate when the second ink receiving layer and the substrate are adjacent to each other.

Examples of the binder types include starch derivatives, such as oxidized starch, esterified starch, and phosphorylated starch; cellulose derivatives, such as carboxymethyl cellulose and hydroxyethyl cellulose; casein, gelatin, soybean protein, polyvinyl alcohol, and derivatives thereof; conjugated polymer latex, such as polyvinylpyrrolidone, maleic anhydride resin, styrene-butadiene copolymers, and methyl methacrylate-butadiene copolymers; acrylic polymer latex, such as acrylic acid ester and methacrylic acid ester polymers; vinyl-based polymer latex, such as ethylene-vinyl acetate copolymers; functional group-modified polymer latex of the polymers mentioned above with monomers containing functional groups, such as a carboxyl group; those obtained by cationizing the polymers mentioned above using cationic groups; those obtained by cationizing the surfaces of the polymers mentioned above using cationic surfactants; those obtained by polymerizing monomers constituting the polymers mentioned above in the presence of cationic polyvinyl alcohol so as to disperse the polyvinyl alcohol on the surface of the polymer; those obtained by polymerizing monomers constituting the polymers mentioned above in a suspension/dispersion liquid of cationic colloidal particles so as to disperse the cationic colloidal particles on the surface of the polymer; aqueous binders, such as thermosetting synthetic resin, e.g., melamine resin and urea resin; polymers and copolymers of acrylic acid esters and methacrylic acid esters, such as polymethyl methacrylate; and synthetic resin, such as polyurethane resin, unsaturated polyester resin, vinyl chloride-vinyl acetate copolymers, polyvinyl butyral, and alkyd resin.

Among the binders mentioned above, polyvinyl alcohol and polyvinyl alcohol derivatives are suitably used. Examples of the polyvinyl alcohol derivatives include cation-modified polyvinyl alcohol, anion-modified polyvinyl alcohol, silanol-modified polyvinyl alcohol, polyvinyl acetal, and the like. As the cation-modified polyvinyl alcohols, polyvinyl alcohols having primary to tertiary amino groups or a quaternary ammonium group in the main chain or the side chain of polyvinyl alcohol described in Japanese Patent Laid-Open No. 61-10483 are suitable, for example.

The polyvinyl alcohol can be synthesized by saponifying polyvinyl acetate. The degree of saponification of the polyvinyl alcohol is suitably 80 mol % or more and 100 mol % or less and more suitably 85 mol % or more and 98 mol % or less. The degree of saponification is the ratio of the number of moles of hydroxyl groups generated by a saponification reaction when polyvinyl acetate is saponified to obtain polyvinyl alcohol, and a value measured by the method described in JIS-K6726 is used in the present disclosure. The average polymerization degree of the polyvinyl alcohol is suitably 2000 or more and more suitably 2000 or more and 5000 or less. In the present disclosure, as the average polymerization degree, the viscosity average polymerization degree determined by the method described in JIS-K6726 is used.

When preparing the coating liquid for ink receiving layer, it is suitable to use the polyvinyl alcohol and the polyvinyl alcohol derivative in the form of an aqueous solution. In this case, the solid content of the polyvinyl alcohol and the polyvinyl alcohol derivative in the aqueous solution is suitably 3 mass % or more and 20 mass % or less.

For the purpose of increasing the strength of the ink receiving layer, it is suitable to particularly use two kinds of alcohols of silanol-modified polyvinyl alcohol and polyvinyl alcohol having a high degree of saponification in which the degree of saponification is 98 mol % or more in combination for the first ink receiving layer. The ratio (Silanol-modified polyvinyl alcohol/Polyvinyl alcohol having a degree of saponification of 98 mol % or more) of the silanol-modified polyvinyl alcohol and the polyvinyl alcohol having a degree of saponification of 98 mol % or more in the first ink receiving layer is suitably 20/80 or more and 80/20 or less in terms of mass ratio. Due to the fact that the ratio is within the range mentioned above, the strength and the permeability of the ink receiving layer can be further increased.

For the purpose of improving the permeability of the ink, it is suitable to use polyvinyl alcohol having a degree of saponification of 88 mol % alone for the second ink receiving layer. Due to the relationship between the combination of the binder types and the addition amount thereof in the second ink receiving layer and the first ink receiving layer, both the permeability and the strength of the ink receiving layer when printing is performed with the pigment ink can be achieved.

Cationic Polymer

The first ink receiving layer and the second ink receiving layer contain a cationic polymer. The cationic polymer has a function of dispersing the anionic inorganic particles in a liquid and has a function of increasing the strength of the ink receiving layer.

In the first ink receiving layer and the second ink receiving layer, due to a synergistic effect with the binder (particularly polyvinyl alcohol) in the ink receiving layer and, in the second ink receiving layer, due to the fact that the adhesiveness with the substrate is further improved, the strength of the ink receiving layer is improved.

The content of the cationic polymer of the first ink receiving layer is suitably 5 mass % or more and 30 mass % or less and more suitable 5 mass % or more and 20 mass % or less based on the content of the anionic inorganic particles from the point of the strength and the color development properties of the ink receiving layer.

The content of the cationic polymer of the first ink receiving layer is more suitably 5 mass % or more and more suitably 10 mass % or more based on the content of the anionic inorganic particles. The content is suitably 30 mass % or less in the respect of color development properties. The content is more suitably 20 mass % or less.

As the cationic polymer, polyvinyl pyridine salt, polyalkylaminoethyl acrylate, polyalkylaminoethyl methacrylate, polyvinyl imidazole, polybiguanide, polyguanide, polyallylamine, polyethyleneimine, polyvinylamine, dicyandiamide-polyalkylene polyamine condensate, polyalkylene-polyamine dicyandiamide ammonium condensate, dicyandiamide-formalin condensate, addition polymer of epichlorohydrin-dialkylamine, polydiallyldimethylammoniumchloride, and a copolymer of diallyldimethylammoniumchloride.sulfur dioxide, and derivatives thereof, and the like can be mentioned, for example. Among the above, polyvinylamine, polydiallyldimethylammoniumchloride, and polyallylamine are suitable in the respect of achieving both the color development properties and the strength of the ink receiving layer. Polydiallyldimethylammoniumchloride is particularly suitable.

In the present disclosure, the weight average molecular weight of the cationic polymer is suitably 2,000 or more and 100,000 or less, more suitably 5,000 or more and 100,000 or less, and still more suitably 10,000 or more and 100,000 or less. Due to the fact that the weight average molecular weight of the cationic polymer is within the ranges mentioned above, the color development properties and the strength of the ink receiving layer can be further increased.

Polyvalent Metal Salt

In the present disclosure, the first ink receiving layer contains a polyvalent metal salt from the point of the bleeding resistance of the pigment ink. Among polyvalent metal salts, a water-soluble polyvalent metal salt is suitable.

The content of the polyvalent metal salt based on the anionic inorganic particles in the first ink receiving layer is 5 mass % or more and 40 mass % or less. When the content is less than 5 mass %, an effect of improving the bleeding resistance is low, and therefore the content is not suitable. When the content is larger than 40 mass %, the strength of a coating film of the ink receiving layer tends to decrease when the pigment ink is printed, and therefore the content is not suitable. The content of the polyvalent metal salt based on the anionic inorganic particles in the first ink receiving layer is more suitably 10 mass % or more and 30 mass % or less and still more suitably 10 mass % or more and 20 mass % or less.

The content ratio of the cationic polymer to the polyvalent metal salt in the first ink receiving layer needs to be 1.0 or more and 8.0 or less in terms of mass ratio of (Content of polyvalent metal salt/Content of cationic polymer) in the respect of achieving both color development properties and bleeding resistance. When the content ratio is less than 1.0, a sufficient level in terms of color development properties cannot be obtained. When the content ratio exceeds 8.0, the pigment ink instantly aggregates on the ink receiving layer surface, and therefore a sufficient level in terms of color development properties cannot be similarly obtained. The content ratio of the cationic polymer to the polyvalent metal salt is more suitably 1.0 or more and 4.0 or less and more suitably 1.5 or more and 4.0 or less. Due to the fact that the cationic polymer and the polyvalent metal salt are contained in the ink receiving layer in the content ratio mentioned above, the properties as a high molecular weight substance of the cationic polymer and the properties as a low molecular weight substance of the polyvalent metal salt synergistically act, so that good color development properties and good bleeding resistance are obtained.

Even when the polyvalent metal salt is blended in the second ink receiving layer, the bleeding resistance is not improved so much and, on the other hand, the strength of the second ink receiving layer tends to be reduced. Therefore, when the second ink receiving layer is provided, the content of the polyvalent metal salt based on the anionic inorganic particles in the second ink receiving layer is suitably 0 mass % or more and 10 mass % or less and more suitably 0 mass % or more and 5 mass % or less.

In the present disclosure, the "water-soluble" means that 1 mass % or more of the polyvalent metal salt dissolves in water under normal temperature normal pressure.

Specifically, examples of the polyvalent metal salt include metal salts and complexes selected from magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten, and bismuth.

Furthermore, specifically, examples include, for example, calcium acetate, calcium chloride, calcium formate, barium acetate, barium phosphate, manganese chloride, manganese acetate, manganese formate dihydrate, cupric chloride, ammonium chloride copper (II) dihydrate, cobalt chloride, thiocyanic acid cobalt, nickel chloride hexahydrate, nickel acetate tetrahydrate, aluminum chloride, polyaluminum chloride, aluminum nitrate nonahydrate, aluminum chloride hexahydrate, ferrous bromide, ferrous chloride, ferrour chloride, zinc phenolsulfonate, zinc bromide, zinc chloride, zinc nitrate hexahydrate, titanium tetrachloride, tetraisopropyl titanate, titanium acetyl acetonate, titanium lactate, zirconium acetyl acetonate, zirconyl acetate, zirconyl ammonium carbonate, zirconyl stearate, zirconyl octylate, zirconyl nitrate, zirconium oxychloride, zirconium hydroxychloride, chromium acetate, magnesium chloride hexahydrate, magnesium citrate nonahydrate, sodium phosphorustungstate, sodium tungsten citrate, 12 tungstophosphoric acid n-hydrate, 12 tungstosilic acid 26-hydrate, molybdenum chloride, 12 molybdophosphoric acid n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium octylate, praseodymium nitrate, neodymium nitrate, samarium nitrate, europium nitrate, gadolinium nitrate, dysprosium nitrate, erbium nitrate, ytterbium nitrate, hafnium chloride, and bismuth nitrate. These substances may be used alone or in combination of two or more kinds thereof. Sulfates have excessively high aggregation properties of the pigment ink, and therefore are not suitable in the respect of controlling the color development properties in the present disclosure.

Among the above, aluminum containing compounds, such as polyaluminum chloride, titanium containing compounds, zirconium containing compounds, and metal compounds (salts or complexes) of Group IIIB series of the element periodic table are suitable. In particular, polyaluminum chloride is the most suitable from the point of achieving both the color development properties and the bleeding resistance in the pigment ink.

The polyaluminum chloride is represented by the following general formulae (1) to (3), for example. General Formula (1): $[Al_2(OH)_nCl_{6-n}]_m$, General Formula (2): $[Al(OH)_3]_nAlCl_3$ General Formula (3): $Al_n(OH)_mCl_{(3n-m)}$ (In the formula, m is 0<m<3n.) For example, $[Al_6(OH)_{15}]^{3+}$, $[Al_8(OH)_{20}]^{4+}$, $[Al_{13}(OH)_{34}]^{5+}$, and $[AL_{21}(OH)_{60}]^{3+}$, are mentioned.

Examples of commercially-available polyaluminum chlorides include polyaluminum chloride (PAC) (manufactured by Taki Chemical Co., Ltd.), polyaluminum hydroxide (Patio) (manufactured by Asada Chemical INDUSTRY Co., Ltd.), PURACHEM WT (manufactured by RIKENGREEN CO., LTD.), SYLOJET A200E (manufactured by Grace Chemical), and the like.

Other Additives

In the present disclosure, the ink receiving layers of the first ink receiving layer and the second ink receiving layer may contain other additives other than the above-described substances. Specific examples of the additives include pH adjusters, thickeners, fluidity modifiers, antifoaming agents, foam inhibitors, surfactants, mold release agents, penetrants, color pigments, color dyes, fluorescent brightening agents, ultraviolet absorbers, antioxidants, antiseptics, antifungal agents, water resistant additives, dye-fixing agents, curing agents, and weather resistant materials.

Back Coat Layer

In the present disclosure, a back coat layer may be provided on a surface opposite to the surface on which the ink receiving layer is provided of the substrate for the purpose of increasing the handling properties, the conveyance aptitude, and the conveyance scratch resistance in continuation printing in the case of loading a large number of sheets. The back coat layer suitably contains a white pigment, a binder, and the like. The thickness of the back coat layer is set in such a manner that the dry coating amount is 0.2 g/m$^2$ or more and 2 g/m$^2$ or less.

Pigment Ink Ejection Amount

The recording medium of the present disclosure is the disclosure relating to an ink jet recording medium suitably used in ink jet printers for professionals provided with a pigment ink.

The ink jet printers for professionals provided with a pigment ink suitably used by professional cameramen or professional graphic designers in the field of fine art is required to have very high color development properties. Therefore, toe ink ejection amount is as large as 25 g/m$^2$ or more and 40 g/m$^2$ or less in terms of the maximum ejection amount per unit area. Such a system is demanded to achieve both excellent color development properties and bleeding resistance and to cause no cracking of the ink receiving layer or the like.

Method for Producing Recording Medium in the present disclosure, a method for producing a recording medium is not particularly limited, and a method for producing a recording medium having a process of preparing a coating liquid for ink receiving layer and a process of applying a coating liquid for ink receiving layer to a substrate is suitable. Hereinafter, the method for producing a recording medium is described.

Method for Producing Substrate

In the present disclosure, as a method for producing the substrate, a generally used papermaking method can be applied. Examples of the papermaking machine include fourdrinier paper machines, cylinder paper machines, drum paper machines, and twin wire paper machines. In order to improve the surface smoothness of the substrate, surface treatment may be performed by applying heat and pressure during the papermaking process or after the papermaking process. Specific examples of the surface treatment methods include calendar treatment, such as machine calendar and super calendar.

Method for Forming Ink Receiving Layer

In the recording medium of the present disclosure, as a method for forming the ink receiving layer on the substrate, the following method can be mentioned, for example. First, the coating liquid for ink receiving layer is prepared. Then, the coating liquid is applied onto the substrate, and then dried, whereby the recording medium of the present disclosure can be obtained. As a method for applying the coating liquid, a curtain coater, a coater using an extrusion system, a coater using a slide hopper system, an air knife, a bar coater, and the like are usable. During the application, the coating liquid may be warmed. Examples of a drying method after the application include methods using hot air dryers, such as a linear tunnel dryer, an arch dryer, an air loop dryer, and a sine curve air float dryer, and methods using a dryer utilizing infrared rays, a heating dryer, microwaves, and the like, for example.

The present disclosure can provide an ink jet recording medium excellent in color development properties and bleeding resistance of an image to be formed with a pigment ink and also excellent in the strength of the ink receiving layer.

EXAMPLES

Hereinafter, the present disclosure is described in more detail with reference to Examples and Comparative Examples. The present disclosure is not limited by the following examples without deviating from the scope of the present disclosure. In the following examples, "part(s)" is on a mass basis unless otherwise particularly specified.

Production of Recording Medium
Production of Substrate 80 parts of LBKP having a Canadian Standard Freeness of 450 mLCSF, 20 parts of NBKP having a Canadian Standard. Freeness of 480 mLCSF, 0.60 part of cationized starch, 10 parts of heavy calcium carbonate, 15 parts of light calcium carbonate, 0.20 part of alkyl ketene dimer, and 0.05 part of cationic polyacrylamide were mixed, and then water was added in such a manner that the solid content was 3.0 mass % to thereby obtain a paper stuff. Subsequently, the paper stuff was formed into paper with a Fourdrinier paper machine, and then subjected to three-stage wet pressing, followed by drying with a multi-cylinder dryer. Thereafter, the resulting paper was impregnated with an aqueous oxidized starch solution in such a manner that the solid content after the drying was 1.0 g/m$^2$ using a size press apparatus, and then dried. Furthermore, the resulting paper was subjected to finishing treatment with a machine calendar to produce a paper substrate. The physical properties of the obtained paper substrate were as follows: Basis weight: 320 g/m$^2$, Cobb sizing degree: 15 seconds (Cobb60), Air permeability: 50 seconds, Bekk smoothness: 30 seconds, Gurley stiffness: 11.0 mN, Thickness: 230 μm, and Paper density: 0.95. By changing the press method in the wet press process, four kinds of substrates different in the Ra of the substrate were produced. When the arithmetic average roughness Ra (Cutoff value of 0.8 mm) in JISB0601-2001 of the substrates was measured, the Ra of each substrate was 1.0 μm, 3.0 μm, 5.0 μm, or 7.0 μm.

Production of Recording Medium 1
Coating Liquid for First Ink Receiving Layer

Into pure water, 100 parts of wet silica SYLOID C809 (manufactured by GRACE CHEMICAL, Average particle diameter of 9.0 μm) and 5 parts of polydiallyldimethylammoniumchloride (manufactured by BASF, CatioFastBP, Weight average molecular weight of 80000) which is a cationic polymer in terms of solid content were added. Thereafter, water was added, and then stirred for 30 minutes with a mixer to prepare a dispersion liquid. The average particle diameter of the dispersion liquid was 9.0 μm as measured by a laser diffraction particle diameter distribution meter (manufactured by Shimadzu Corporation, SALD-2300). To the dispersion liquid, PVA235 (manufactured by CRALAY CO., LTD., Degree of polymerization of 3500, Degree of saponification of 88 mol %) was added as a binder so as to be 25 parts based on 100 parts of the wet silica in terms of solid content. The dispersion liquid to which the binder was added was stirred for 30 minutes with a mixer. Furthermore, 1 part of polyaluminum chloride (SylojetA200E, manufactured by Grace Chemical) was added as a polyvalent metal salt, and then further stirred for 30 minutes with a mixer to prepare a coating liquid (coating liquid for first ink receiving layer) for use in a first ink receiving layer of a recording medium 1.

Production of Ink Receiving Layer

The coating liquid for first ink receiving layer described above was applied to the surface side of the substrate having the Ra of 3.0 μm produced above with an air knife. Herein, the application conditions were adjusted so that the thickness of the first ink receiving layer was 30 μm. Subsequently, the resultant substance was dried at 100° C. to obtain a recording medium 1. The arithmetic average roughness Ra (Cutoff value of 0.8 mm) specified by JIS B 0601:2001 of the outermost surface of the ink receiving layer was 3.0 μm.

Production of Recording Media 2 to 9

Recording media 2 to 9 were produced by the same method as the method of the recording medium 1 with the compounding ratios and the physical properties as shown in Tables 1 to 2.

Table 1 also shows the total coating amount of the ink receiving layer, the thickness of the entire ink receiving layer, and the arithmetic average roughness Ra (Cutoff value of 0.8 mm) specified by JIS B 0601:2001 of the surface of the substrate and the recording medium.

Production of Recording Medium 10

Coating Liquid for First Ink Receiving Layer

Into pure water, 100 parts of wet silica SYLOID C809 (manufactured by GRACE CHEMICAL, Average particle diameter of 9.0 μm) and 5 parts of polydiallyldimethylammoniumchloride (manufactured by BASF, CatioFastBP, Weight average molecular weight of 80000) which is a cationic polymer in terms of solid content were added. Thereafter, water was added, and then stirred for 30 minutes with a mixer to prepare a dispersion liquid. The average particle diameter of the dispersion liquid was 9.0 μm as measured by a laser diffraction particle diameter distribution meter (manufactured by Shimadzu Corporation, SALD-2300). To the dispersion liquid, PVA117 (manufactured by CRALAY CO., LTD., Degree of polymerization of 1700, Degree of saponification of 98 mol %) was added as a binder so as to be 40 parts based on 100 parts of the wet silica in terms of solid content. Furthermore, to the dispersion liquid, R-1130 (manufactured by CRALAY CO., LTD., Silanol modified, Degree of saponification of 98 mol %) was added as a binder so as to be 40 parts based on 100 parts of the wet silica in terms of solid content. The dispersion liquid to which the two kinds of binders were added was stirred for 30 minutes with a mixer. Furthermore, 5 parts of polyaluminum chloride (SylojetA200E, manufactured by Grace Chemical) was added as a polyvalent metal salt, and then further stirred for 30 minutes with a mixer to prepare a coating liquid (coating liquid for first ink receiving layer) for use in a first ink receiving layer of a recording medium 10.

Coating Liquid for Second Ink Receiving Layer

Onto pure water, 100 parts of wet silica SYLOID C809 (manufactured by GRACE CHEMICAL, Average particle diameter of 9.0 μm) and 5 parts of polydiallyldimethylammoniumchloride (manufactured by BASF, CatioFastBP, Weight average molecular weight of 80000) which is a cationic polymer in terms of solid content were added. Thereafter, water was added, and then stirred for 30 minutes with a mixer to prepare a dispersion liquid. The average particle diameter of the dispersion liquid was 9.0 μm as measured by a laser diffraction particle diameter distribution meter (manufactured by Shimadzu Corporation, SALD-2300). To the dispersion liquid, PVA235 (manufactured by CRALAY CO., LTD., Degree of polymerization of 3500, Degree of saponification of 88 mol %) was added as a binder so as to be 25 parts based on 100 parts of the wet silica in terms of solid content. Then, the dispersion liquid to which the binder was added was stirred with a mixer for 30 minutes to prepare a coating liquid (coating liquid for second ink receiving layer) for use in a second ink receiving layer of the recording medium 10.

Production of Ink Receiving Layer

Sequential application of applying the coating liquid for second ink receiving layer described above to the surface side of the substrate having the Ra of 1.0 μm produced above with an air knife, and then applying the coating liquid for first ink receiving layer to the surface to which the coating liquid for second ink receiving layer was given was performed. Herein, the application conditions were adjusted so that the thickness $L_2$ of the second ink receiving layer was 15 μm and the thickness $L_1$ of the first ink receiving layer immediately above the second ink receiving layer was 15 μm. Subsequently, the resultant substance was dried at 100° C. to obtain a recording medium 10. The arithmetic average roughness Ra (Cutoff value of 0.8 mm) specified by JIS B 0601:2001 of the outermost surface of the ink receiving layer was 1.0 μm.

Production of Recording Media 11 to 55

Recording media 11 to 55 were produced by the same method as the method of the recording medium 10 with the compounding ratios and the physical properties as shown in Tables 3 to 11.

Tables 3, 6, and 9 also show the total coating amount of the ink receiving layer, the thickness of the entire ink receiving layer, the arithmetic average roughness Ra (Cutoff value of 0.8 μm) specified by JIS B 0601:2001 of the surface of the substrate and the recording medium, and the $L_1/L_2$ ratio.

Production of Recording Medium 56

A recording medium 56 was produced by the same method as the method of the recording medium 10 with the compounding ratios and the physical properties as shown in Tables 13 and 14.

For each of the cationic polymers of the first ink receiving layer and the second ink receiving layer, 10 parts of SHALLOL DC902P (manufactured by Daiichi Kogyo Seiyaku Co., Ltd., Weight average molecular weight of 9000) was used.

Production of Recording Medium 57

A recording medium 57 was produced by the same method as the method of the recording medium 56 with the compounding ratios and the physical properties as shown in Tables 13 and 14.

For the polyvalent metal salt of the first ink receiving layer, 15 parts of calcium nitrate tetrahydrate (manufactured by Kishida Chemical Co., Ltd.) was used.

Production of Recording Medium 58

A recording medium 58 was produced by the same method as the method of the recording medium 56 with the compounding ratios and the physical properties as shown in Tables 13 and 14.

15 parts of monovalent potassium nitrate (manufactured by Kishida Chemical Co., Ltd.) was used instead of the polyvalent metal salt added to the first ink receiving layer.

Production of Recording Medium 59

A recording medium 59 was produced by the same method as the method of the recording medium 1 with the compounding ratios and the physical properties as shown in Tables 13 and 14.

As the anionic inorganic particles contained in the first ink receiving layer and the second ink receiving layer, wet silica SYLOIDK200 (manufactured by Grace Chemical, Average particle diameter of 2.5 μm) was used.

Production of Recording Medium 60

A recording medium 60 was produced by the same method as the method of the recording medium 10 with the compounding ratios and the physical properties as shown in Tables 13 and 14.

As the anionic inorganic particles contained in the first ink receiving layer and the second ink receiving layer, wet silica GasiL₂3D (manufactured by PQ Cooperation, Average particle diameter of 4.4 μm) was used.

Production of Recording Medium 61

A recording medium 61 was produced by the same method as the method of the recording medium 10 with the compounding ratios and the physical properties as shown in Tables 13 and 14.

As the anionic inorganic particles contained in the first ink receiving layer and the second ink receiving layer, wet silica C807 (manufactured by Grace Chemical, Average particle diameter of 7.0 μm) was used.

Production of Recording Medium 62

A recording medium 62 was produced by the same method as the method of the recording medium 10 with the compounding ratios and the physical properties as shown in Tables 13 and 14.

As the anionic inorganic particles contained in the first ink receiving layer and the second ink receiving layer, wet silica SYLOIDED5 (manufactured by Grace Chemical, Average particle diameter of 8.0 μm) was used.

Production of Recording Medium 63

A recording medium 63 was produced by the same method as the method of the recording medium 10 with the compounding ratios and the physical properties as shown in Tables 13 and 14.

As the anionic inorganic particles contained in the first ink receiving layer and the second ink receiving layer, wet silica HP39 (manufactured by PQ COOPERATION, Average particle diameter of 10.0 μm) was used.

Production of Recording Medium 64

A recording medium 64 was produced by the same method as the method of the recording medium 10 with the compounding ratios and the physical properties as shown in Tables 13 and 14.

As the anionic inorganic particles contained in the first ink receiving layer and the second ink receiving layer, wet silica SYLOIDC812 (manufactured by Grace Chemical, Average particle diameters of 12.0 μm) was used.

Production of Recording Medium 65

A recording medium 65 was produced by the same method as the method of the recording medium 10 with the compounding ratios and the physical properties as shown in Tables 13 and 14.

As the anionic inorganic particles contained in the first ink receiving layer and the second ink receiving layer, wet silica HP395 (manufactured by PQ COOPERATION, Average particle diameters of 14.5 μm) was used.

Table 12 also shows the total coating amount of the ink receiving layer, the thickness of the entire ink receiving layer, the arithmetic average roughness Ra (Cutoff value of 0.8 mm) specified by JIS B 0601:2001 of the surface of the substrate and the recording medium, and the $L_1/L_2$ ratio in the recording media 56 to 65.

Examples 1 to 58 and Comparative Examples 1 to 7

The following evaluations were performed using the recording media 1 to 65.

Evaluation

Hereinafter, methods for evaluating the color development properties, the bleeding resistance, and the strength of the ink receiving layer are described. In each of the following evaluations, when an image was recorded on the recording media, printing was carried out using an ImagePROGRAF Pro-1000 (manufactured by CANON KABUSHIKI KAISHA) as the ink jet recording apparatus in the printing mode of fine art high concentration and no color correction.

The above-described ink jet recording apparatus is an apparatus recording an image with a pigment ink.

In the inkjet recording apparatus, an image recorded under the condition where one ink droplet of about 4 ng is given to a unit region of 1/1200 inch×1/1200 inch at a resolution of 1200 dpi×1200 dpi is defined as a 100% recording duty.

The evaluation results are shown in Tables 15 to 19. In the present disclosure, AA to B of the evaluation criteria of the following evaluation criteria were suitable levels and C and D thereof were unacceptable levels.

Evaluation of Color Development Properties (Image Density)

Black solid printing was performed to each of the recording media 1 to 65 in the environment of Temperature: 24° C. and Relative humidity: 50%. The image densities thereof were individually measured using an optical reflection densitometer (Trade name: 530 spectral densitometer, manufactured by X-Rite). The color development properties of the image to be obtained were evaluated from the obtained image density. The evaluation criteria are as follows.

AA: The image density was 1.70 or more.
A: The image density was 1.65 or more and less than 1.70.
B. The image density was 1.60 or more and less than 1.65.
C: The image density was 1.50 or more and less than 1.60.
D: The image density was less than 1.50.

Evaluation of Bleeding Resistance

An image of a bleeding evaluation pattern was formed on each of the recording media 1 to 65 in the environment of Temperature: 30° C. and Relative humidity: 80%. The bleeding evaluation pattern is an image in which five thin lines (Width of 10 μm) of Cyan, Magenta, Yellow, Red, Green, and Blue are present in a black solid region. The bleeding resistance of each recording medium was evaluated using the recording media on which the image of the bleeding evaluation pattern was formed based on the following evaluation criteria.

AA: No colors bleed at all.
A: Only one color among the five colors slightly bleeds.
B: Only two colors among the five colors slightly bleed.
C: Three to four colors among the five colors bleed.
D: All the five colors among the five colors bleed.

Evaluation of Strength of Ink Receiving Layer

Black solid printing was performed to each of the recording media 1 to 65 in the environment of Temperature: 24° C. and Relative humidity: 50%. After the recording media were allowed to stand for one day, the strength of the ink receiving layer was measured using a friction and wear analyzer (manufactured by Kyowa Interface Science Co., LTD., Automatic friction and wear analyzer, TRIBOSTER TS501), to the tip of which an attachment with a diameter of 0.25 mmϕ was attached.

Loads applied to the black solid printing were changed to 100 g, 125 g, 150 g, and 200 g, and then the strength of the ink receiving layer of each of the recording media was measured.

AA: The ink receiving layer is not scraped at all even at the 200 g load.
A. The ink receiving layer is partially scraped at the 200 g load but is not scraped at all at the 150 g load.
B: The ink receiving layer is partially scraped at the 150 g load but is not scraped at all at the 125 g load.
C: The ink receiving layer is partially scraped at the 125 g load but is not scraped at all at the 100 g load.
D: The ink receiving layer is scraped even at the 100 g load.

TABLE 1

| Recording medium | | Total coating amount of ink receiving layer (g/m²) | Thickness of entire ink receiving (μm) | Substrate surface Ra layer (μm) | Recording medium surface Ra (μm) |
|---|---|---|---|---|---|
| Comparative Example 1 | Recording medium 1 | 10 | 30 | 3.0 | 3.0 |
| Comparative Example 2 | Recording medium 2 | 10 | 30 | 3.0 | 3.0 |
| Example 1 | Recording medium 3 | 10 | 30 | 3.0 | 3.0 |
| Example 2 | Recording medium 4 | 10 | 30 | 3.0 | 3.0 |
| Example 3 | Recording medium 5 | 10 | 30 | 3.0 | 3.0 |
| Example 4 | Recording medium 6 | 10 | 30 | 3.0 | 3.0 |
| Example 5 | Recording medium 7 | 10 | 30 | 3.0 | 3.0 |
| Example 6 | Recording medium 8 | 10 | 30 | 3.0 | 3.0 |
| Comparative Example 3 | Recording medium 9 | 10 | 30 | 3.0 | 3.0 |

TABLE 2

| | | First ink receiving layer (Outermost surface layer) | | | | | | | | | | |
|---|---|---|---|---|---|---|---|---|---|---|---|---|
| | | Materials | | | | | | | | | (Polyvalent metal salt/ Cationic polymer) | Ink receiving layer coating amount (g/m²) | Thickness $L_1$ (μm) |
| | Recording medium | Inorganic particles 1 | | Binder 1-1 | | Binder 1-2 | | Cationic polymer 1 | | Polyvalent metal salt 1 | | | | |
| | | Type | Parts | Type | Parts | Type | Parts | Type | Parts | Type | Parts | | | |
| Comparative Example 1 | Recording medium 1 | SYLOID C809 Average particle diameter 9.0 μm | 100 | PVA 235 | 25 | — | | Catio Fast BP | 5 | Sylojet A200E | 1 | 0.2 | 10 | 30 |
| Comparative Example 2 | Recording medium 2 | SYLOID C809 Average particle diameter 9.0 μm | 100 | PVA 235 | 25 | | | Catio Fast BP | 5 | Sylojet A200E | 3 | 0.6 | 10 | 30 |
| Example 1 | Recording medium 3 | SYLOID C809 Average particle diameter 9.0 μm | 100 | PVA 235 | 25 | | | Catio Fast BP | 5 | Sylojet A200E | 5 | 1.0 | 10 | 30 |
| Example 2 | Recording medium 4 | SYLOID C809 Average particle diameter 9.0 μm | 100 | PVA 235 | 25 | | | Catio Fast BP | 5 | Sylojet A200E | 6 | 1.2 | 10 | 30 |
| Example 3 | Recording medium 5 | SYLOID C809 Average particle diameter 9.0 μm | 100 | PVA 235 | 25 | | | Catio Fast BP | 5 | Sylojet A200E | 7.5 | 1.5 | 10 | 30 |
| Example 4 | Recording medium 6 | SYLOID C809 Average particle diameter 9.0 μm | 100 | PVA 235 | 25 | | | Catio Fast BP | 5 | Sylojet A200E | 10 | 2.0 | 10 | 30 |
| Example 5 | Recording medium 7 | SYLOID C809 Average particle diameter 9.0 μm | 100 | PVA 235 | 25 | | | Catio Fast BP | 5 | Sylojet A200E | 20 | 4.0 | 10 | 30 |
| Example 6 | Recording medium 8 | SYLOID C809 Average particle diameter 9.0 μm | 100 | PVA 235 | 25 | | | Catio Fast BP | 5 | Sylojet A200E | 40 | 8.0 | 10 | 30 |
| Comparative Example 3 | Recording medium 9 | SYLOID C809 Average particle diameter 9.0 μm | 100 | PVA 235 | 25 | | | Catio Fast BP | 5 | Sylojet A200E | 50 | 10.0 | 10 | 30 |

TABLE 3

| Recording medium | | Total coating amount of ink receiving layer (g/m²) | Thickness of entire ink receiving layer (μm) | Substrate surface Ra (μm) | Recording medium surface Ra (μm) | ($L_1$/$L_2$ ratio) |
|---|---|---|---|---|---|---|
| Example 7 | Recording medium 10 | 10 | 30 | 1.0 | 1.0 | 1.0 |
| Example 8 | Recording medium 11 | 10 | 30 | 3.0 | 3.0 | 1.0 |
| Example 9 | Recording medium 12 | 10 | 30 | 5.0 | 4.0 | 1.0 |
| Example 10 | Recording medium 13 | 10 | 30 | 7.0 | 4.5 | 1.0 |
| Comparative Example 4 | Recording medium 14 | 10 | 30 | 7.0 | 4.5 | 1.0 |
| Example 11 | Recording medium 15 | 10 | 30 | 7.0 | 4.5 | 1.0 |
| Example 12 | Recording medium 16 | 10 | 30 | 7.0 | 4.5 | 1.0 |
| Example 13 | Recording medium 17 | 10 | 30 | 7.0 | 4.5 | 1.0 |
| Example 14 | Recording medium 18 | 10 | 30 | 7.0 | 4.5 | 1.0 |
| Example 15 | Recording medium 19 | 10 | 30 | 7.0 | 4.5 | 1.0 |
| Comparative Example 5 | Recording medium 20 | 10 | 30 | 7.0 | 4.5 | 1.0 |
| Example 16 | Recording medium 21 | 10 | 30 | 7.0 | 4.5 | 1.0 |
| Example 17 | Recording medium 22 | 10 | 30 | 7.0 | 4.5 | 1.0 |
| Example 18 | Recording medium 23 | 10 | 30 | 7.0 | 4.5 | 1.0 |
| Example 19 | Recording medium 24 | 10 | 30 | 7.0 | 4.5 | 1.0 |
| Example 20 | Recording medium 25 | 10 | 30 | 7.0 | 4.5 | 1.0 |
| Example 21 | Recording medium 26 | 10 | 30 | 7.0 | 4.5 | 1.0 |

TABLE 4

| | | First ink receiving layer (Outermost surface layer) | | | | | | | | | | | |
|---|---|---|---|---|---|---|---|---|---|---|---|---|---|
| | | Materials | | | | | | | | | (Polyvalent metal salt/ Cationic polymer) | Ink receiving layer coating amount (g/m²) | Thickness $L_1$ (μm) |
| | Recording medium | Inorganic particles 1 | | Binder 1-1 | | Binder 1-2 | | Cationic polymer 1 | | Polyvalent metal salt 1 | | | |
| | | Type | Parts | Type | Parts | Type | Parts | Type | Parts | Type | Parts | | |
| Example 7 | Recording medium 10 | SYLOID C809 Average particle diameter 9.0 μm | 100 | PVA 117 | 40 | R-1130 | 40 | Catio Fast BP | 5 | Sylojet A200E | 5 | 1.0 | 5 | 15 |
| Example 8 | Recording medium 11 | SYLOID C809 Average particle diameter 9.0 μm | 100 | PVA 117 | 40 | R-1130 | 40 | Catio Fast BP | 5 | Sylojet A200E | 5 | 1.0 | 5 | 15 |
| Example 9 | Recording medium 12 | SYLOID C809 Average particle diameter 9.0 μm | 100 | PVA 117 | 40 | R-1130 | 40 | Catio Fast BP | 5 | Sylojet A200E | 5 | 1.0 | 5 | 15 |
| Example 10 | Recording medium 13 | SYLOID C809 Average particle diameter 9.0 μm | 100 | PVA 117 | 40 | R-1130 | 40 | Catio Fast BP | 5 | Sylojet A200E | 5 | 1.0 | 5 | 15 |
| Comparative Example 4 | Recording medium 14 | SYLOID C809 Average particle diameter 9.0 μm | 100 | PVA 117 | 40 | R-1130 | 40 | Catio Fast BP | 5 | Sylojet A200E | 0 | 0.0 | 5 | 15 |
| Example 11 | Recording medium 15 | SYLOID C809 Average particle diameter 9.0 μm | 100 | PVA 117 | 40 | R-1130 | 40 | Catio Fast BP | 5 | Sylojet A200E | 6 | 1.2 | 5 | 15 |
| Example 12 | Recording medium 16 | SYLOID C809 Average particle diameter 9.0 μm | 100 | PVA 117 | 40 | R-1130 | 40 | Catio Fast BP | 5 | Sylojet A200E | 10 | 2.0 | 5 | 15 |
| Example 13 | Recording medium 17 | SYLOID C809 Average particle diameter 9.0 μm | 100 | PVA 117 | 40 | R-1130 | 40 | Catio Fast BP | 5 | Sylojet A200E | 20 | 4.0 | 5 | 15 |
| Example 14 | Recording medium 18 | SYLOID C809 Average particle diameter 9.0 μm | 100 | PVA 117 | 40 | R-1130 | 40 | Catio Fast BP | 5 | Sylojet A200E | 30 | 6.0 | 5 | 15 |
| Example 15 | Recording medium 19 | SYLOID C809 Average particle diameter 9.0 μm | 100 | PVA 117 | 40 | R-1130 | 40 | Catio Fast BP | 5 | Sylojet A200E | 40 | 8.0 | 5 | 15 |
| Comparative Example 5 | Recording medium 20 | SYLOID C809 Average particle diameter 9.0 μm | 100 | PVA 117 | 40 | R-1130 | 40 | Catio Fast BP | 5 | Sylojet A200E | 50 | 10.0 | 5 | 15 |
| Example 16 | Recording medium 21 | SYLOID C809 Average particle diameter 9.0 μm | 100 | PVA 117 | 40 | R-1130 | 40 | Catio Fast BP | 10 | Sylojet A200E | 10 | 1.0 | 5 | 15 |

TABLE 4-continued

| | | First ink receiving layer (Outermost surface layer) | | | | | | | | | | | |
|---|---|---|---|---|---|---|---|---|---|---|---|---|---|
| | | Materials | | | | | | | | | (Polyvalent | Ink receiving layer | Thickness |
| | Recording | Inorganic particles 1 | | Binder 1-1 | | Binder 1-2 | | Cationic polymer 1 | | Polyvalent metal salt 1 | | metal salt/ Cationic | coating amount | $L_1$ |
| | medium | Type | Parts | Type | Parts | Type | Parts | Type | Parts | Type | Parts | polymer) | (g/m²) | (μm) |
| Example 17 | Recording medium 22 | SYLOID C809 Average particle diameter 9.0 μm | 100 | PVA 117 | 40 | R-1130 | 40 | Catio Fast BP | 10 | Sylojet A200E | 12 | 1.2 | 5 | 15 |
| Example 18 | Recording medium 23 | SYLOID C809 Average particle diameter 9.0 μm | 100 | PVA 117 | 40 | R-1130 | 40 | Catio Fast BP | 10 | Sylojet A200E | 15 | 1.5 | 5 | 15 |
| Example 19 | Recording medium 24 | SYLOID C809 Average particle diameter 9.0 μm | 100 | PVA 117 | 40 | R-1130 | 40 | Catio Fast BP | 10 | Sylojet A200E | 20 | 2.0 | 5 | 15 |
| Example 20 | Recording medium 25 | SYLOID C809 Average particle diameter 9.0 μm | 100 | PVA 117 | 40 | R-1130 | 40 | Catio Fast BP | 10 | Sylojet A200E | 30 | 3.0 | 5 | 15 |
| Example 21 | Recording medium 26 | SYLOID C809 Average particle diameter 9.0 μm | 100 | PVA 117 | 40 | R-1130 | 40 | Catio Fast BP | 10 | Sylojet A200E | 40 | 4.0 | 5 | 15 |

TABLE 5

| | | Second ink receiving layer | | | | | | | | | | |
|---|---|---|---|---|---|---|---|---|---|---|---|---|
| | | Materials | | | | | | | (Polyvalent | Ink receiving layer | Thickness |
| | Recording | Inorganic particles 2 | | Binder 2 | | Cationic polymer 2 | | Polyvalent metal salt 2 | | metal salt/ Cationic | coating amount | $L_2$ |
| | medium | Type | Parts | Type | Parts | Type | Parts | Type | Parts | polymer) | (g/m²) | (μm) |
| Example 7 | Recording medium 10 | SYLOID C809 Average particle diameter 9.0 μm | 100 | PVA235 | 25 | Catio Fast BP | 5 | Sylojet A200E | 0 | 0.0 | 5 | 15 |
| Example 8 | Recording medium 11 | SYLOID C809 Average particle diameter 9.0 μm | 100 | PVA235 | 25 | Catio Fast BP | 5 | Sylojet A200E | 0 | 0.0 | 5 | 15 |
| Example 9 | Recording medium 12 | SYLOID C809 Average particle diameter 9.0 μm | 100 | PVA235 | 25 | Catio Fast BP | 5 | Sylojet A200E | 0 | 0.0 | 5 | 15 |
| Example 10 | Recording medium 13 | SYLOID C809 Average particle diameter 9.0 μm | 100 | PVA235 | 25 | Catio Fast BP | 5 | Sylojet A200E | 0 | 0.0 | 5 | 15 |
| Comparative Example 4 | Recording medium 14 | SYLOID C809 Average particle diameter 9.0 μm | 100 | PVA235 | 25 | Catio Fast BP | 5 | Sylojet A200E | 0 | 0.0 | 5 | 15 |
| Example 11 | Recording medium 15 | SYLOID C809 Average particle diameter 9.0 μm | 100 | PVA235 | 25 | Catio Fast BP | 5 | Sylojet A200E | 0 | 0.0 | 5 | 15 |
| Example 12 | Recording medium 16 | SYLOID C809 Average particle diameter 9.0 μm | 100 | PVA235 | 25 | Catio Fast BP | 5 | Sylojet A200E | 0 | 0.0 | 5 | 15 |
| Example 13 | Recording medium 17 | SYLOID C809 Average particle diameter 9.0 μm | 100 | PVA235 | 25 | Catio Fast BP | 5 | Sylojet A200E | 0 | 0.0 | 5 | 15 |
| Example 14 | Recording medium 18 | SYLOID C809 Average particle diameter 9.0 μm | 100 | PVA235 | 25 | Catio Fast BP | 5 | Sylojet A200E | 0 | 0.0 | 5 | 15 |
| Example 15 | Recording medium 19 | SYLOID C809 Average particle diameter 9.0 μm | 100 | PVA235 | 25 | Catio Fast BP | 5 | Sylojet A200E | 0 | 0.0 | 5 | 15 |
| Comparative Example 5 | Recording medium 20 | SYLOID C809 Average particle diameter 9.0 μm | 100 | PVA235 | 25 | Catio Fast BP | 5 | Sylojet A200E | 0 | 0.0 | 5 | 15 |

TABLE 5-continued

| | | Second ink receiving layer | | | | | | | | | |
|---|---|---|---|---|---|---|---|---|---|---|---|
| | | Materials | | | | | | | | (Polyvalent | Ink receiving layer | Thick- |
| | | Inorganic particles 2 | | Binder 2 | | Cationic polymer 2 | | Polyvalent metal salt 2 | | metal salt/ | coating | ness |
| | Recording medium | Type | Parts | Type | Parts | Type | Parts | Type | Parts | Cationic polymer) | amount (g/m²) | $L_2$ (µm) |
| Example 16 | Recording medium 21 | SYLOID C809 Average particle diameter 9.0 µm | 100 | PVA235 | 25 | Catio Fast BP | 5 | Sylojet A200E | 0 | 0.0 | 5 | 15 |
| Example 17 | Recording medium 22 | SYLOID C809 Average particle diameter 9.0 µm | 100 | PVA235 | 25 | Catio Fast BP | 5 | Sylojet A200E | 0 | 0.0 | 5 | 15 |
| Example 18 | Recording medium 23 | SYLOID C809 Average particle diameter 9.0 µm | 100 | PVA235 | 25 | Catio Fast BP | 5 | Sylojet A200E | 0 | 0.0 | 5 | 15 |
| Example 19 | Recording medium 24 | SYLOID C809 Average particle diameter 9.0 µm | 100 | PVA235 | 25 | Catio Fast BP | 5 | Sylojet A200E | 0 | 0.0 | 5 | 15 |
| Example 20 | Recording medium 25 | SYLOID C809 Average particle diameter 9.0 µm | 100 | PVA235 | 25 | Catio Fast BP | 5 | Sylojet A200E | 0 | 0.0 | 5 | 15 |
| Example 21 | Recording medium 26 | SYLOID C809 Average particle diameter 9.0 µm | 100 | PVA235 | 25 | Catio Fast BP | 5 | Sylojet A200E | 0 | 0.0 | 5 | 15 |

TABLE 6

| | Recording medium | Total coating amount of ink receiving layer (g/m²) | Thickness of entire ink receiving layer (µm) | Substrate surface Ra (µm) | Recording medium surface Ra (µm) | ($L_1/L_2$ ratio) |
|---|---|---|---|---|---|---|
| Example 22 | Recording medium 27 | 10 | 30 | 7.0 | 4.5 | 1.0 |
| Example 23 | Recording medium 28 | 10 | 30 | 7.0 | 4.5 | 1.0 |
| Example 24 | Recording medium 29 | 10 | 30 | 7.0 | 4.5 | 1.0 |
| Example 25 | Recording medium 30 | 10 | 30 | 7.0 | 4.5 | 1.0 |
| Example 26 | Recording medium 31 | 10 | 30 | 7.0 | 4.5 | 1.0 |
| Example 27 | Recording medium 32 | 10 | 30 | 7.0 | 4.5 | 1.0 |
| Example 28 | Recording medium 33 | 10 | 30 | 7.0 | 4.5 | 1.0 |
| Example 29 | Recording medium 34 | 10 | 30 | 7.0 | 4.5 | 1.0 |
| Example 30 | Recording medium 35 | 10 | 30 | 7.0 | 4.5 | 1.0 |
| Example 31 | Recording medium 36 | 10 | 30 | 7.0 | 4.5 | 1.0 |
| Example 32 | Recording medium 37 | 10 | 30 | 7.0 | 4.5 | 1.0 |

TABLE 7

| | | First ink receiving layer (Outermost surface layer) | | | | | | | | | | | |
|---|---|---|---|---|---|---|---|---|---|---|---|---|---|
| | | Materials | | | | | | | | | (Polyvalent | Ink receiving layer | Thick- |
| | | Inorganic particles 1 | | Binder 1-1 | | Binder 1-2 | | Cationic polymer 1 | | Polyvalent metal salt 1 | | metal salt/ | coating | ness |
| | Recording medium | Type | Parts | Type | Parts | Type | Parts | Type | Parts | Type | Parts | Cationic polymer) | amount (g/m²) | $L_1$ (µm) |
| Example 22 | Recording medium 27 | SYLOID C809 Average particle diameter 9.0 µm | 100 | PVA 117 | 40 | R-1130 | 40 | Catio Fast BP | 10 | Sylojet A200E | 15 | 1.5 | 5 | 15 |
| Example 23 | Recording medium 28 | SYLOID C809 Average particle diameter 9.0 µm | 100 | PVA 117 | 40 | R-1130 | 40 | Catio Fast BP | 10 | Sylojet A200E | 15 | 1.5 | 5 | 15 |
| Example 24 | Recording medium 29 | SYLOID C809 Average particle diameter 9.0 µm | 100 | PVA 117 | 40 | R-1130 | 40 | Catio Fast BP | 10 | Sylojet A200E | 15 | 1.5 | 5 | 15 |

TABLE 7-continued

First ink receiving layer (Outermost surface layer)

| | | Materials | | | | | | | | | (Polyvalent metal salt/ Cationic polymer) | Ink receiving layer coating amount (g/m$^2$) | Thickness $L_1$ (μm) |
|---|---|---|---|---|---|---|---|---|---|---|---|---|---|
| | | Inorganic particles 1 | | Binder 1-1 | | Binder 1-2 | | Cationic polymer 1 | | Polyvalent metal salt 1 | | | |
| Recording medium | | Type | Parts | Type | Parts | Type | Parts | Type | Parts | Type | Parts | | |
| Example 25 | Recording medium 30 | SYLOID C809 Average particle diameter 9.0 μm | 100 | PVA 117 | 40 | R-1130 | 40 | Catio Fast BP | 10 | Sylojet A200E | 15 | 1.5 | 5 | 15 |
| Example 26 | Recording medium 31 | SYLOID C809 Average particle diameter 9.0 μm | 100 | PVA 117 | 40 | R-1130 | 40 | Catio Fast BP | 10 | Sylojet A200E | 15 | 1.5 | 5 | 15 |
| Example 27 | Recording medium 32 | SYLOID C809 Average particle diameter 9.0 μm | 100 | PVA 117 | 20 | R-1130 | 20 | Catio Fast BP | 10 | Sylojet A200E | 10 | 1.0 | 5 | 15 |
| Example 28 | Recording medium 33 | SYLOID C809 Average particle diameter 9.0 μm | 100 | PVA 117 | 25 | R-1130 | 25 | Catio Fast BP | 10 | Sylojet A200E | 10 | 1.0 | 5 | 15 |
| Example 29 | Recording medium 34 | SYLOID C809 Average particle diameter 9.0 μm | 100 | PVA 117 | 35 | R-1130 | 35 | Catio Fast BP | 10 | Sylojet A200E | 10 | 1.0 | 5 | 15 |
| Example 30 | Recording medium 35 | SYLOID C809 Average particle diameter 9.0 μm | 100 | PVA 117 | 45 | R-1130 | 45 | Catio Fast BP | 10 | Sylojet A200E | 10 | 1.0 | 5 | 15 |
| Example 31 | Recording medium 36 | SYLOID C809 Average particle diameter 9.0 μm | 100 | PVA 117 | 50 | R-1130 | 50 | Catio Fast BP | 10 | Sylojet A200E | 10 | 1.0 | 5 | 15 |
| Example 32 | Recording medium 37 | SYLOID C809 Average particle diameter 9.0 μm | 100 | PVA 117 | 60 | R-1130 | 60 | Catio Fast BP | 10 | Sylojet A200E | 10 | 1.0 | 5 | 15 |

TABLE 8

Second ink receiving layer

| | | Materials | | | | | | | | (Polyvalent metal salt/ Cationic polymer) | Ink receiving layer coating amount (g/m$^2$) | Thickness $L_2$ (μm) |
|---|---|---|---|---|---|---|---|---|---|---|---|---|
| | | Inorganic particles 2 | | Binder 2 | | Cationic polymer 2 | | Polyvalent metal salt 2 | | | | |
| Recording medium | | Type | Parts | Type | Parts | Type | Parts | Type | Parts | | | |
| Example 22 | Recording medium 27 | SYLOID C809 Average particle diameter 9.0 μm | 100 | PVA235 | 10 | Catio Fast BP | 5 | Sylojet A200E | 0 | 0.0 | 5 | 15 |
| Example 23 | Recording medium 28 | SYLOID C809 Average particle diameter 9.0 μm | 100 | PVA235 | 15 | Catio Fast BP | 5 | Sylojet A200E | 0 | 0.0 | 5 | 15 |
| Example 24 | Recording medium 29 | SYLOID C809 Average particle diameter 9.0 μm | 100 | PVA235 | 30 | Catio Fast BP | 5 | Sylojet A200E | 0 | 0.0 | 5 | 15 |
| Example 25 | Recording medium 30 | SYLOID C809 Average particle diameter 9.0 μm | 100 | PVA235 | 40 | Catio Fast BP | 5 | Sylojet A200E | 0 | 0.0 | 5 | 15 |
| Example 26 | Recording medium 31 | SYLOID C809 Average particle diameter 9.0 μm | 100 | PVA235 | 50 | Catio Fast BP | 5 | Sylojet A200E | 0 | 0.0 | 5 | 15 |
| Example 27 | Recording medium 32 | SYLOID C809 Average particle diameter 9.0 μm | 100 | PVA235 | 25 | Catio Fast BP | 5 | Sylojet A200E | 0 | 0.0 | 5 | 15 |
| Example 28 | Recording medium 33 | SYLOID C809 Average particle diameter 9.0 μm | 100 | PVA235 | 25 | Catio Fast BP | 5 | Sylojet A200E | 0 | 0.0 | 5 | 15 |
| Example 29 | Recording medium 34 | SYLOID C809 Average particle diameter 9.0 μm | 100 | PVA235 | 25 | Catio Fast BP | 5 | Sylojet A200E | 0 | 0.0 | 5 | 15 |
| Example 30 | Recording medium 35 | SYLOID C809 Average particle diameter 9.0 μm | 100 | PVA235 | 25 | Catio Fast BP | 5 | Sylojet A200E | 0 | 0.0 | 5 | 15 |

TABLE 8-continued

| | | Second ink receiving layer | | | | | | | | | |
|---|---|---|---|---|---|---|---|---|---|---|---|
| | | Materials | | | | | | | (Polyvalent metal salt/ Cationic polymer) | Ink receiving layer coating amount (g/m²) | Thickness L₂ (μm) |
| | Recording medium | Inorganic particles 2 | | Binder 2 | | Cationic polymer 2 | | Polyvalent metal salt 2 | | | |
| | | Type | Parts | Type | Parts | Type | Parts | Type | Parts | | |
| Example 31 | Recording medium 36 | SYLOID C809 Average particle diameter 9.0 μm | 100 | PVA235 | 25 | Catio Fast BP | 5 | Sylojet A200E | 0 | 0.0 | 5 | 15 |
| Example 32 | Recording medium 37 | SYLOID C809 Average particle diameter 9.0 μm | 100 | PVA235 | 25 | Catio Fast BP | 5 | Sylojet A200E | 0 | 0.0 | 5 | 15 |

TABLE 9

| | Recording medium | Total coating amount of ink receiving layer (g/m²) | Thickness of entire ink receiving layer (μm) | Substrate surface Ra (μm) | Recording medium surface Ra (μm) | (L₁/L₂ ratio) |
|---|---|---|---|---|---|---|
| Example 33 | Recording medium 38 | 10 | 30 | 7.0 | 4.5 | 1.0 |
| Example 34 | Recording medium 39 | 10 | 30 | 7.0 | 4.5 | 1.0 |
| Example 35 | Recording medium 40 | 10 | 30 | 7.0 | 4.5 | 1.0 |
| Example 36 | Recording medium 41 | 10 | 30 | 7.0 | 4.5 | 1.0 |
| Example 37 | Recording medium 42 | 10 | 30 | 7.0 | 4.5 | 1.0 |
| Example 38 | Recording medium 43 | 10 | 30 | 7.0 | 4.5 | 1.0 |
| Example 39 | Recording medium 44 | 10 | 30 | 7.0 | 4.5 | 1.0 |
| Example 40 | Recording medium 45 | 10 | 30 | 7.0 | 4.5 | 1.0 |
| Example 41 | Recording medium 46 | 10 | 30 | 7.0 | 4.5 | 1.0 |
| Example 42 | Recording medium 47 | 12 | 36 | 7.0 | 4.5 | 1.0 |
| Example 43 | Recording medium 48 | 8 | 24 | 7.0 | 4.5 | 1.0 |
| Example 44 | Recording medium 49 | 6 | 18 | 7.0 | 4.5 | 1.0 |
| Example 45 | Recording medium 50 | 10 | 30 | 7.0 | 4.5 | 1.5 |
| Example 46 | Recording medium 51 | 10 | 30 | 7.0 | 4.5 | 2.3 |
| Example 47 | Recording medium 52 | 10 | 30 | 7.0 | 4.5 | 4.0 |
| Example 48 | Recording medium 53 | 10 | 30 | 7.0 | 4.5 | 0.7 |
| Example 49 | Recording medium 54 | 10 | 30 | 7.0 | 4.5 | 0.4 |
| Example 50 | Recording medium 55 | 10 | 30 | 7.0 | 4.5 | 0.3 |

TABLE 10

| | | First ink receiving layer (Outermost surface layer) | | | | | | | | | | |
|---|---|---|---|---|---|---|---|---|---|---|---|---|
| | | Materials | | | | | | | | (Polyvalent metal salt/ Cationic polymer) | Ink receiving layer coating amount (g/m²) | Thickness L₁ (μm) |
| | Recording medium | Inorganic particles 1 | | Binder 1-1 | | Binder 1-2 | | Cationic polymer 1 | | Polyvalent metal salt 1 | | | |
| | | Type | Parts | Type | Parts | Type | Parts | Type | Parts | Type | Parts | | |
| Example 33 | Recording medium 38 | SYLOID C809 Average particle diameter 9.0 μm | 100 | PVA 117 | 40 | R-1130 | 40 | Catio Fast BP | 15 | Sylojet A200E | 15 | 1.0 | 5 | 15 |
| Example 34 | Recording medium 39 | SYLOID C809 Average particle diameter 9.0 μm | 100 | PVA 117 | 40 | R-1130 | 40 | Catio Fast BP | 20 | Sylojet A200E | 20 | 1.0 | 5 | 15 |
| Example 35 | Recording medium 40 | SYLOID C809 Average particle diameter 9.0 μm | 100 | PVA 117 | 40 | R-1130 | 40 | Catio Fast BP | 30 | Sylojet A200E | 30 | 1.0 | 5 | 15 |
| Example 36 | Recording medium 41 | SYLOID C809 Average particle diameter 9.0 μm | 100 | PVA 117 | 40 | R-1130 | 40 | Catio Fast BP | 10 | Sylojet A200E | 15 | 1.5 | 5 | 15 |

TABLE 10-continued

First ink receiving layer (Outermost surface layer)

| | Recording medium | Inorganic particles 1 Type | Parts | Binder 1-1 Type | Parts | Binder 1-2 Type | Parts | Cationic polymer 1 Type | Parts | Polyvalent metal salt 1 Type | Parts | (Polyvalent metal salt/ Cationic polymer) | Ink receiving layer coating amount (g/m$^2$) | Thickness $L_1$ (μm) |
|---|---|---|---|---|---|---|---|---|---|---|---|---|---|---|
| Example 37 | Recording medium 42 | SYLOID C809 Average particle diameter 9.0 μm | 100 | PVA 117 | 40 | R-1130 | 40 | Catio Fast BP | 10 | Sylojet A200E | 15 | 1.5 | 5 | 15 |
| Example 38 | Recording medium 43 | SYLOID C809 Average particle diameter 9.0 μm | 100 | PVA 117 | 40 | R-1130 | 40 | Catio Fast BP | 10 | Sylojet A200E | 15 | 1.5 | 5 | 15 |
| Example 39 | Recording medium 44 | SYLOID C809 Average particle diameter 9.0 μm | 100 | PVA 117 | 40 | R-1130 | 40 | Catio Fast BP | 10 | Sylojet A200E | 15 | 1.5 | 5 | 15 |
| Example 40 | Recording medium 45 | SYLOID C809 Average particle diameter 9.0 μm | 100 | PVA 117 | 40 | R-1130 | 40 | Catio Fast BP | 10 | Sylojet A200E | 15 | 1.5 | 5 | 15 |
| Example 41 | Recording medium 46 | SYLOID C809 Average particle diameter 9.0 μm | 100 | PVA 117 | 40 | R-1130 | 40 | Catio Fast BP | 10 | Sylojet A200E | 15 | 1.5 | 5 | 15 |
| Example 42 | Recording medium 47 | SYLOID C809 Average particle diameter 9.0 μm | 100 | PVA 117 | 40 | R-1130 | 40 | Catio Fast BP | 10 | Sylojet A200E | 15 | 1.5 | 6 | 18 |
| Example 43 | Recording medium 48 | SYLOID C809 Average particle diameter 9.0 μm | 100 | PVA 117 | 40 | R-1130 | 40 | Catio Fast BP | 10 | Sylojet A200E | 15 | 1.5 | 4 | 12 |
| Example 44 | Recording medium 49 | SYLOID C809 Average particle diameter 9.0 μm | 100 | PVA 117 | 40 | R-1130 | 40 | Catio Fast BP | 10 | Sylojet A200E | 15 | 1.5 | 3 | 9 |
| Example 45 | Recording medium 50 | SYLOID C809 Average particle diameter 9.0 μm | 100 | PVA 117 | 40 | R-1130 | 40 | Catio Fast BP | 10 | Sylojet A200E | 15 | 1.5 | 6 | 18 |
| Example 46 | Recording medium 51 | SYLOID C809 Average particle diameter 9.0 μm | 100 | PVA 117 | 40 | R-1130 | 40 | Catio Fast BP | 10 | Sylojet A200E | 15 | 1.5 | 7 | 21 |
| Example 47 | Recording medium 52 | SYLOID C809 Average particle diameter 9.0 μm | 100 | PVA 117 | 40 | R-1130 | 40 | Catio Fast BP | 10 | Sylojet A200E | 15 | 1.5 | 8 | 24 |
| Example 48 | Recording medium 53 | SYLOID C809 Average particle diameter 9.0 μm | 100 | PVA 117 | 40 | R-1130 | 40 | Catio Fast BP | 10 | Sylojet A200E | 15 | 1.5 | 4 | 12 |
| Example 49 | Recording medium 54 | SYLOID C809 Average particle diameter 9.0 μm | 100 | PVA 117 | 40 | R-1130 | 40 | Catio Fast BP | 10 | Sylojet A200E | 15 | 1.5 | 3 | 9 |
| Example 50 | Recording medium 55 | SYLOID C809 Average particle diameter 9.0 μm | 100 | PVA 117 | 40 | R-1130 | 40 | Catio Fast BP | 10 | Sylojet A200E | 15 | 1.5 | 2 | 6 |

TABLE 11

Second ink receiving layer

| | Recording medium | Inorganic particles 2 Type | Parts | Binder 2 Type | Parts | Cationic polymer 2 Type | Parts | Polyvalent metal salt 2 Type | Parts | (Polyvalent metal salt/ Cationic polymer) | Ink receiving layer coating amount (g/m$^2$) | Thickness $L_2$ (μm) |
|---|---|---|---|---|---|---|---|---|---|---|---|---|
| Example 33 | Recording medium 38 | SYLOID C809 Average particle diameter 9.0 μm | 100 | PVA235 | 25 | Catio Fast BP | 5 | Sylojet A200E | 0 | 0.0 | 5 | 15 |
| Example 34 | Recording medium 39 | SYLOID C809 Average particle diameter 9.0 μm | 100 | PVA235 | 25 | Catio Fast BP | 5 | Sylojet A200E | 0 | 0.0 | 5 | 15 |
| Example 35 | Recording medium 40 | SYLOID C809 Average particle diameter 9.0 μm | 100 | PVA235 | 25 | Catio Fast BP | 5 | Sylojet A200E | 0 | 0.0 | 5 | 15 |

TABLE 11-continued

| | | Second ink receiving layer | | | | | | | | | |
|---|---|---|---|---|---|---|---|---|---|---|---|
| | | Materials | | | | | | | (Polyvalent metal salt/ Cationic polymer) | Ink receiving layer coating amount (g/m²) | Thickness $L_2$ (μm) |
| | Recording medium | Inorganic particles 2 | | Binder 2 | | Cationic polymer 2 | | Polyvalent metal salt 2 | | | |
| | | Type | Parts | Type | Parts | Type | Parts | Type | Parts | | |
| Example 36 | Recording medium 41 | SYLOID C809 Average particle diameter 9.0 μm | 100 | PVA235 | 25 | Catio Fast BP | 10 | Sylojet A200E | 0 | 0.0 | 5 | 15 |
| Example 37 | Recording medium 42 | SYLOID C809 Average particle diameter 9.0 μm | 100 | PVA235 | 25 | Catio Fast BP | 15 | Sylojet A200E | 0 | 0.0 | 5 | 15 |
| Example 38 | Recording medium 43 | SYLOID C809 Average particle diameter 9.0 μm | 100 | PVA235 | 25 | Catio Fast BP | 20 | Sylojet A200E | 0 | 0.0 | 5 | 15 |
| Example 39 | Recording medium 44 | SYLOID C809 Average particle diameter 9.0 μm | 100 | PVA235 | 25 | Catio Fast BP | 30 | Sylojet A200E | 0 | 0.0 | 5 | 15 |
| Example 40 | Recording medium 45 | SYLOID C809 Average particle diameter 9.0 μm | 100 | PVA235 | 25 | Catio Fast BP | 10 | Sylojet A200E | 5 | 0.5 | 5 | 15 |
| Example 41 | Recording medium 46 | SYLOID C809 Average particle diameter 9.0 μm | 100 | PVA235 | 25 | Catio Fast BP | 10 | Sylojet A200E | 10 | 1.0 | 5 | 15 |
| Example 42 | Recording medium 47 | SYLOID C809 Average particle diameter 9.0 μm | 100 | PVA235 | 25 | Catio Fast BP | 10 | Sylojet A200E | 0 | 0.0 | 6 | 18 |
| Example 43 | Recording medium 48 | SYLOID C809 Average particle diameter 9.0 μm | 100 | PVA235 | 25 | Catio Fast BP | 10 | Sylojet A200E | 0 | 0.0 | 4 | 12 |
| Example 44 | Recording medium 49 | SYLOID C809 Average particle diameter 9.0 μm | 100 | PVA235 | 25 | Catio Fast BP | 10 | Sylojet A200E | 0 | 0.0 | 3 | 9 |
| Example 45 | Recording medium 50 | SYLOID C809 Average particle diameter 9.0 μm | 100 | PVA235 | 25 | Catio Fast BP | 10 | Sylojet A200E | 0 | 0.0 | 4 | 12 |
| Example 46 | Recording medium 51 | SYLOID C809 Average particle diameter 9.0 μm | 100 | PVA235 | 25 | Catio Fast BP | 10 | Sylojet A200E | 0 | 0.0 | 3 | 9 |
| Example 47 | Recording medium 52 | SYLOID C809 Average particle diameter 9.0 μm | 100 | PVA235 | 25 | Catio Fast BP | 10 | Sylojet A200E | 0 | 0.0 | 2 | 6 |
| Example 48 | Recording medium 53 | SYLOID C809 Average particle diameter 9.0 μm | 100 | PVA235 | 25 | Catio Fast BP | 10 | Sylojet A200E | 0 | 0.0 | 6 | 18 |
| Example 49 | Recording medium 54 | SYLOID C809 Average particle diameter 9.0 μm | 100 | PVA235 | 25 | Catio Fast BP | 10 | Sylojet A200E | 0 | 0.0 | 7 | 21 |
| Example 50 | Recording medium 55 | SYLOID C809 Average particle diameter 9.0 μm | 100 | PVA235 | 25 | Catio Fast BP | 10 | Sylojet A200E | 0 | 0.0 | 8 | 24 |

TABLE 12

| | Recording medium | Total coating amount of ink receiving layer (g/m²) | Thickness of entire ink receiving layer (μm) | Substrate Ra surface (μm) | Recording medium surface Ra (μm) | ($L_1/L_2$) ratio |
|---|---|---|---|---|---|---|
| Example 51 | Recording medium 56 | 10 | 30 | 7.0 | 4.5 | 1.0 |
| Example 52 | Recording medium 57 | 10 | 30 | 7.0 | 4.5 | 1.0 |
| Comparative Example 6 | Recording medium 58 | 10 | 30 | 7.0 | 4.5 | 1.0 |
| Comparative Example 7 | Recording medium 59 | 10 | 30 | 7.0 | 4.5 | 1.0 |
| Example 53 | Recording medium 60 | 10 | 30 | 7.0 | 4.5 | 1.0 |
| Example 54 | Recording medium 61 | 10 | 30 | 7.0 | 4.5 | 1.0 |

TABLE 12-continued

| | Recording medium | Total coating amount of ink receiving layer (g/m$^2$) | Thickness of entire ink receiving layer (μm) | Substrate Ra surface (μm) | Recording medium surface Ra (μm) | ($L_1/L_2$ ratio) |
|---|---|---|---|---|---|---|
| Example 55 | Recording medium 62 | 10 | 30 | 7.0 | 4.5 | 1.0 |
| Example 56 | Recording medium 63 | 10 | 30 | 7.0 | 4.5 | 1.0 |
| Example 57 | Recording medium 64 | 10 | 30 | 7.0 | 4.5 | 1.0 |
| Example 58 | Recording medium 65 | 10 | 30 | 7.0 | 4.5 | 1.0 |

TABLE 13

| | | First ink receiving layer (Outermost surface layer) | | | | | | | | | | | |
|---|---|---|---|---|---|---|---|---|---|---|---|---|---|
| | | Materials | | | | | | | | | | (Polyvalent metal salt/ Cationic polymer) | Ink receiving layer coating amount (g/m$^2$) | Thickness $L_1$ (μm) |
| | Recording medium | Inorganic particles 1 | | Binder 1-1 | | Binder 1-2 | | Cationic polymer 1 | | Polyvalent metal salt 1 | | | | |
| | | Type | Parts | Type | Parts | Type | Parts | Type | Parts | Type | Parts | | | |
| Example 51 | Recording medium 56 | SYLOID C809 Average particle diameter 9.0 μm | 100 | PVA 117 | 40 | R-1130 | 40 | SHALLOL DC902P | 10 | Sylojet A200E | 15 | 1.5 | 5 | 15 |
| Example 52 | Recording medium 57 | SYLOID C809 Average particle diameter 9.0 μm | 100 | PVA 117 | 40 | R-1130 | 40 | SHALLOL DC902P | 10 | Calcium nitrate tetrahydrate | 15 | 1.5 | 5 | 15 |
| Comparative Example 6 | Recording medium 58 | SYLOID C809 Average particle diameter 9.0 μm | 100 | PVA 117 | 40 | R-1130 | 40 | SHALLOL DC902P | 10 | Potassium nitrate | 15 | 1.5 | 5 | 15 |
| Comparative Example 7 | Recording medium 59 | SYLOID K200 Average particle diameter 2.5 μm | 100 | PVA 117 | 40 | R-1130 | 40 | Catio Fast BP | 10 | Sylojet A200E | 15 | 1.5 | 5 | 15 |
| Example 53 | Recording medium 60 | Gasil 23D Average particle diameter 4.4 μm | 100 | PVA 117 | 40 | R-1130 | 40 | Catio Fast BP | 10 | Sylojet A200E | 15 | 1.5 | 5 | 15 |
| Example 54 | Recording medium 61 | SYLOID C807 Average particle diameter 7.0 μm | 100 | PVA 117 | 40 | R-1130 | 40 | Catio Fast BP | 10 | Sylojet A200E | 15 | 1.5 | 5 | 15 |
| Example 55 | Recording medium 62 | SYLOID ED5 Average particle diameter 8.0 μm | 100 | PVA 117 | 40 | R-1130 | 40 | Catio Fast BP | 10 | Sylojet A200E | 15 | 1.5 | 5 | 15 |
| Example 56 | Recording medium 63 | Gasil HP39 Average particle diameter 10.0 μm | 100 | PVA 117 | 40 | R-1130 | 40 | Catio Fast BP | 10 | Sylojet A200E | 15 | 1.5 | 5 | 15 |
| Example 57 | Recording medium 64 | SYLOID C812 Average particle diameter 12.0 μm | 100 | PVA 117 | 40 | R-1130 | 40 | Catio Fast BP | 10 | Sylojet A200E | 15 | 1.5 | 5 | 15 |

TABLE 13-continued

| | | First ink receiving layer (Outermost surface layer) | | | | | | | | | | | |
|---|---|---|---|---|---|---|---|---|---|---|---|---|---|
| | | Materials | | | | | | | | | (Polyvalent metal salt/ Cationic polymer) | Ink receiving layer coating amount (g/m²) | Thickness $L_1$ (μm) |
| | Recording medium | Inorganic particles 1 | | Binder 1-1 | | Binder 1-2 | | Cationic polymer 1 | | Polyvalent metal salt 1 | | | |
| | | Type | Parts | Type | Parts | Type | Parts | Type | Parts | Type | Parts | | |
| Example 58 | Recording medium 65 | Gasil HP395 Average particle diameter 14.5 μm | 100 | PVA 117 | 40 | R-1130 | 40 | Catio Fast BP | 10 | Sylojet A200E | 15 | 1.5 | 5 | 15 |

TABLE 14

| | | Second ink receiving layer | | | | | | | | | | |
|---|---|---|---|---|---|---|---|---|---|---|---|---|
| | | Materials | | | | | | | | (Polyvalent metal salt/ Cationic polymer) | Ink receiving layer coating amount (g/m²) | Thickness $L_2$ (μm) |
| | Recording medium | Inorganic particles 2 | | Binder 2 | | Cationic polymer 2 | | Polyvalent metal salt 2 | | | | |
| | | Type | Parts | Type | Parts | Type | Parts | Type | Parts | | | |
| Example 51 | Recording medium 56 | SYLOID C809 Average particle diameter 9.0 μm | 100 | PVA235 | 25 | SHALLOL D0902P | 10 | Sylojet A200E | 0 | 0.0 | 5 | 15 |
| Example 52 | Recording medium 57 | SYLOID C809 Average particle diameter 9.0 μm | 100 | PVA235 | 25 | SHALLOL D0902P | 10 | Sylojet A200E | 0 | 0.0 | 5 | 15 |
| Comparative Example 6 | Recording medium 58 | SYLOID C809 Average particle diameter 9.0 μm | 100 | PVA235 | 25 | SHALLOL D0902P | 10 | Sylojet A200E | 0 | 0.0 | 5 | 15 |
| Comparative Example 7 | Recording medium 59 | SYLOID K200 Average particle diameter 2.5 μm | 100 | PVA235 | 25 | Catio Fast BP | 10 | Sylojet A200E | 0 | 0.0 | 5 | 15 |
| Example 53 | Recording medium 60 | Gasil 23D Average particle diameter 4.4 μm | 100 | PVA235 | 25 | Catio Fast BP | 10 | Sylojet A200E | 0 | 0.0 | 5 | 15 |
| Example 54 | Recording medium 61 | SYLOID C807 Average particle diameter 7.0 μm | 100 | PVA235 | 25 | Catio Fast BP | 10 | Sylojet A200E | 0 | 0.0 | 5 | 15 |
| Example 55 | Recording medium 62 | SYLOID ED5 Average particle diameter 8.0 μm | 100 | PVA235 | 25 | Catio Fast BP | 10 | Sylojet A200E | 0 | 0.0 | 5 | 15 |
| Example 56 | Recording medium 63 | Gasil HP39 Average particle diameter 10.0 μm | 100 | PVA235 | 25 | Catio Fast BP | 10 | Sylojet A200E | 0 | 0.0 | 5 | 15 |
| Example 57 | Recording medium 64 | SYLOID C812 Average particle diameter 12.0 μm | 100 | PVA235 | 25 | Catio Fast BP | 10 | Sylojet A200E | 0 | 0.0 | 5 | 15 |
| Example 58 | Recording medium 65 | Gasil HP395 Average particle diameter 14.5 μm | 100 | PVA235 | 25 | Catio Fast BP | 10 | Sylojet A200E | 0 | 0.0 | 5 | 15 |

TABLE 15

| | Recording medium | Evaluation results | | |
|---|---|---|---|---|
| | | Color development properties | Bleeding resistance | Receiving layer strength |
| Comparative Example 1 | Recording medium 1 | B | D | B |
| Comparative Example 2 | Recording medium 2 | B | C | B |
| Example 1 | Recording medium 3 | B | B | B |
| Example 2 | Recording medium 4 | A | A | B |
| Example 3 | Recording medium 5 | A | A | B |
| Example 4 | Recording medium 6 | A | A | B |
| Example 5 | Recording medium 7 | A | A | B |
| Example 6 | Recording medium 8 | B | A | B |
| Comparative Example 3 | Recording medium 9 | C | AA | C |

TABLE 16

| | Recording medium | Evaluation results | | |
|---|---|---|---|---|
| | | Color development properties | Bleeding resistance | Receiving layer strength |
| Example 7 | Recording medium 10 | AA | A | A |
| Example 8 | Recording medium 11 | A | A | A |
| Example 9 | Recording medium 12 | A | B | A |
| Example 10 | Recording medium 13 | A | B | B |
| Comparative Example 4 | Recording medium 14 | B | D | B |
| Example 11 | Recording medium 15 | A | A | B |
| Example 12 | Recording medium 16 | A | A | B |
| Example 13 | Recording medium 17 | A | A | B |
| Example 14 | Recording medium 18 | B | AA | B |
| Example 15 | Recording medium 19 | B | AA | B |
| Comparative Example 5 | Recording medium 20 | C | AA | C |
| Example 16 | Recording medium 21 | A | A | A |
| Example 17 | Recording medium 22 | AA | AA | A |
| Example 18 | Recording medium 23 | AA | AA | A |
| Example 19 | Recording medium 24 | AA | AA | A |
| Example 20 | Recording medium 25 | A | AA | A |
| Example 21 | Recording medium 26 | B | AA | B |

TABLE 17

| | Recording medium | Evaluation results | | |
|---|---|---|---|---|
| | | Color development properties | Bleeding resistance | Receiving layer strength |
| Example 22 | Recording medium 27 | A | AA | B |
| Example 23 | Recording medium 28 | AA | AA | B |
| Example 24 | Recording medium 29 | AA | AA | A |
| Example 25 | Recording medium 30 | AA | A | A |
| Example 26 | Recording medium 31 | B | A | A |
| Example 27 | Recording medium 32 | B | A | B |
| Example 28 | Recording medium 33 | A | A | B |
| Example 29 | Recording medium 34 | A | A | A |
| Example 30 | Recording medium 35 | A | A | A |
| Example 31 | Recording medium 36 | A | B | A |
| Example 32 | Recording medium 37 | B | B | AA |

TABLE 18

| | Recording medium | Evaluation results | | |
| --- | --- | --- | --- | --- |
| | | Color development properties | Bleeding resistance | Receiving layer strength |
| Example 33 | Recording medium 38 | AA | AA | AA |
| Example 34 | Recording medium 39 | A | AA | AA |
| Example 35 | Recording medium 40 | B | AA | A |
| Example 36 | Recording medium 41 | AA | AA | AA |
| Example 37 | Recording medium 42 | AA | AA | AA |
| Example 38 | Recording medium 43 | AA | AA | AA |
| Example 39 | Recording medium 44 | A | AA | AA |
| Example 40 | Recording medium 45 | AA | AA | A |
| Example 41 | Recording medium 46 | A | AA | B |
| Example 42 | Recording medium 47 | AA | AA | A |
| Example 43 | Recording medium 48 | AA | AA | AA |
| Example 44 | Recording medium 49 | AA | B | AA |
| Example 45 | Recording medium 50 | AA | AA | AA |
| Example 46 | Recording medium 51 | AA | AA | AA |
| Example 47 | Recording medium 52 | B | AA | AA |
| Example 48 | Recording medium 53 | AA | AA | AA |
| Example 49 | Recording medium 54 | AA | A | A |
| Example 50 | Recording medium 55 | AA | A | B |

TABLE 19

| | Recording medium | Evaluation results | | |
| --- | --- | --- | --- | --- |
| | | Color development properties | Bleeding resistance | Receiving layer strength |
| Example 51 | Recording medium 56 | A | AA | AA |
| Example 52 | Recording medium 57 | A | A | AA |
| Comparative Example 6 | Recording medium 58 | B | D | AA |
| Comparative Example 7 | Recording medium 59 | C | A | AA |
| Example 53 | Recording medium 60 | B | A | AA |
| Example 54 | Recording medium 61 | A | AA | AA |
| Example 55 | Recording medium 62 | AA | AA | AA |
| Example 56 | Recording medium 63 | AA | AA | AA |
| Example 57 | Recording medium 64 | AA | AA | AA |
| Example 58 | Recording medium 65 | B | AA | AA |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-180712 filed Sep. 15, 2016, which is hereby incorporated by reference herein in its entirety.

What is claimed is:

1. An ink jet recording medium comprising:
a substrate; and
at least two or more ink receiving layers on the substrate, wherein:
a first ink receiving layer which is an outermost surface layer contains anionic inorganic particles having an average particle diameter of 3.0 μm or more, a binder, a cationic polymer, and a polyvalent metal salt,
a content of the polyvalent metal salt based on the anionic inorganic particles in the first ink receiving layer is 5 mass % or more and 40 mass % or less,
a content ratio of the polyvalent metal salt to the cationic polymer in the first ink receiving layer (Content of polyvalent metal salt/Content of cationic polymer) is 1.0 or more and 8.0 or less,
an arithmetic average roughness Ra of a surface of the recording medium is 1.0 μm or more, and
a second ink receiving layer adjacent to a lower side of the first ink receiving layer, wherein the second ink receiving layer contains a polyvalent metal salt of a content lower than the content of the polyvalent metal salt contained in the first ink receiving layer or does not contain a polyvalent metal salt.

2. The ink jet recording medium according to claim 1, wherein:
the second ink receiving layer contains anionic inorganic particles having an average particle diameter of 3.0 μm or more, a binder, and a cationic polymer.

3. The ink jet recording medium according to claim 1, wherein:
the second ink receiving layer contains the polyvalent metal salt, and
the polyvalent metal salt contained in the second ink receiving layer is polyaluminum chloride.

4. The ink jet recording medium according to claim 2, wherein: the content of the binder based on the anionic inorganic particles in the first ink receiving layer is 50 mass % or more and 100 mass % or less, and the content of the binder based on the anionic inorganic particles in the second ink receiving layer is 15 mass % or more and 40 mass % or less.

5. The ink jet recording medium according to claim 1, wherein:
the polyvalent metal salt contained in the first ink receiving layer is polyaluminum chloride.

6. The ink jet recording medium according to claim 1, wherein:
the content ratio of the polyvalent metal salt to the cationic polymer in the first ink receiving layer is 1.5 or more and 4.0 or less.

7. The ink jet recording medium according to claim 2, wherein:
a content of the binder based on the anionic inorganic particles in the second ink receiving layer is lower than a content of the binder based on the anionic inorganic particles in the first ink receiving layer.

8. The ink jet recording medium according to claim 1, wherein:
a content of the cationic polymer based on the anionic inorganic particles in the first ink receiving layer is 5 mass % or more and 30 mass % or less.

9. The ink jet recording medium according to claim 1, wherein:
a content of the polyvalent metal salt based on the anionic inorganic particles in the second ink receiving layer is 0 mass % or more and 10 mass % or less.

10. The ink jet recording medium according to claim 1, wherein:
the arithmetic average roughness Ra of the surface of the recording medium is 1.0 μm or more and 4.5 μm or less.

11. The ink jet recording medium according to claim 1, wherein:
The anionic inorganic particles have the average particle diameter of 3.0 μm or more and 14.0 μm or less.

* * * * *